(12) United States Patent
Inoue et al.

(10) Patent No.: US 11,370,052 B2
(45) Date of Patent: Jun. 28, 2022

(54) ARC WELDING SYSTEM AND WIRE FEEDING DEVICE

(71) Applicant: DAIHEN Corporation, Osaka (JP)

(72) Inventors: Masahiro Inoue, Osaka (JP); Yukiya Morita, Osaka (JP); Hisao Miyahara, Osaka (JP); Hirokazu Kawai, Osaka (JP); Songjie Hou, Osaka (JP); Hayato Baba, Osaka (JP); Hideo Shiozaki, Osaka (JP); Tetsuo Era, Osaka (JP); Tomoyuki Ueyama, Osaka (JP)

(73) Assignee: DAIHEN Corporation, Osaka (JP)

( * ) Notice: Subject to any disclaimer, the term of this patent is extended or adjusted under 35 U.S.C. 154(b) by 172 days.

(21) Appl. No.: 16/080,251

(22) PCT Filed: Mar. 9, 2017

(86) PCT No.: PCT/JP2017/009487
§ 371 (c)(1),
(2) Date: Aug. 27, 2018

(87) PCT Pub. No.: WO2017/155041
PCT Pub. Date: Sep. 14, 2017

(65) Prior Publication Data
US 2019/0015922 A1 Jan. 17, 2019

Related U.S. Application Data

(60) Provisional application No. 62/307,189, filed on Mar. 11, 2016.

(30) Foreign Application Priority Data

Apr. 12, 2016 (JP) .................................. 2016-079830

(51) Int. Cl.
*B23K 9/133* (2006.01)
*B23K 9/10* (2006.01)
(Continued)

(52) U.S. Cl.
CPC ............ *B23K 9/133* (2013.01); *B23K 9/0732* (2013.01); *B23K 9/092* (2013.01); *B23K 9/1062* (2013.01);
(Continued)

(58) Field of Classification Search
CPC .... B23K 9/0732; B23K 9/092; B23K 9/1062; B23K 9/1075; B23K 9/125; B23K 9/133; B23K 9/1336; B23K 9/12
See application file for complete search history.

(56) References Cited

U.S. PATENT DOCUMENTS 3,567,900 A * 3/1971 Nelson ................. B23K 33/004
219/137.8
4,102,483 A * 7/1978 Ueyama ............... B23K 9/1336
219/137.51
(Continued)

FOREIGN PATENT DOCUMENTS

CN 1478629 A 3/2004
CN 101062530 A 10/2007
(Continued)

OTHER PUBLICATIONS

JPH1190627 translation (Year: 2020).*
(Continued)

*Primary Examiner* — Ibrahime A Abraham
*Assistant Examiner* — Frederick F Calvetti
(74) *Attorney, Agent, or Firm* — Rudy J. Ng; Bret E. Field; Bozicevic, Field & Francis LLP

(57) ABSTRACT

An arc welding system of a consumable electrode type comprises: a wire feeding device that feeds welding wire from a wire feeding source to a welding torch; and a power supply device that supplies electric power between the welding wire fed to the welding torch and a base material, the system being configured to weld the base material by arc
(Continued)

generated by the supplied electric power. The wire feeding device is provided with: an intermediate wire feeding source that is disposed between the wire feeding source and the welding torch and is configured to temporarily accommodate the welding wire fed from the wire feeding source and to feed the accommodated welding wire to the welding torch; a pull-out feeding part that feeds the welding wire at the wire feeding source to the intermediate wire feeding source; and a push-out feeding part that feeds the welding wire accommodated in the intermediate wire feeding source to the welding torch.

3 Claims, 12 Drawing Sheets

(51) Int. Cl.
  B23K 9/09    (2006.01)
  B23K 9/073   (2006.01)
  B23K 9/12    (2006.01)
(52) U.S. Cl.
  CPC ............ *B23K 9/1075* (2013.01); *B23K 9/125* (2013.01); *B23K 9/1336* (2013.01)

(56) References Cited

U.S. PATENT DOCUMENTS

| | | | | | |
|---|---|---|---|---|---|
| 4,206,862 | A * | 6/1980 | DaCosta | ............... | B23K 9/1336 219/137.2 |
| 4,261,500 | A * | 4/1981 | Samokovliski | ...... | B23K 9/1336 226/188 |
| 4,798,929 | A * | 1/1989 | Itoh | ......................... | B23H 1/024 219/69.12 |
| 4,897,523 | A * | 1/1990 | Parks | ...................... | B23K 9/125 219/130.21 |
| 5,402,927 | A * | 4/1995 | Frasch | .................. | B23K 20/007 228/180.5 |
| 6,025,573 | A * | 2/2000 | Stava | ...................... | B23K 9/092 219/130.21 |
| 6,831,251 | B1 * | 12/2004 | Artelsmair | ............ | B23K 9/1336 219/137.71 |
| 7,102,090 | B2 * | 9/2006 | Morisada | ............... | G11B 15/106 200/293 |
| 8,129,660 | B2 * | 3/2012 | Schorghuber | ........... | B23K 9/133 219/137.2 |
| 8,519,302 | B2 * | 8/2013 | Myers | ..................... | B23K 9/093 219/130.51 |
| 8,704,132 | B2 * | 4/2014 | Artelsmair | .............. | B23K 9/124 901/41 |
| 8,895,896 | B2 * | 11/2014 | O'Donnell | ............ | B23K 9/1043 219/130.1 |
| 9,085,041 | B2 * | 7/2015 | Peters | ................. | B23K 35/0261 |
| 9,375,801 | B2 * | 6/2016 | Cenko | ..................... | B23K 9/287 |
| 9,731,372 | B2 * | 8/2017 | O'Donnell | ............ | B23K 9/1043 |
| 10,343,233 | B2 * | 7/2019 | Gelmetti | ................. | B23K 9/133 |
| 10,543,551 | B2 * | 1/2020 | Hsu | ........................ | B23K 9/0216 |
| 2002/0108985 | A1 * | 8/2002 | Garcia | ................... | B65H 51/20 226/45 |
| 2003/0006222 | A1 | 1/2003 | Houston et al. | | |
| 2004/0016737 | A1 | 1/2004 | Huismann et al. | | |
| 2005/0023253 | A1 * | 2/2005 | Houston | ............... | B23K 9/0953 219/121.11 |
| 2005/0103766 | A1 * | 5/2005 | Iizuka | ................... | B23K 9/0216 219/124.34 |
| 2006/0037952 | A1 * | 2/2006 | Myers | ................... | B23K 9/1062 219/130.51 |
| 2006/0124622 | A1 * | 6/2006 | Hubinger | ................. | B23K 9/28 219/137.31 |
| 2007/0007265 | A1 * | 1/2007 | Myers | ................... | B23K 9/1068 219/137 PS |
| 2007/0102409 | A1 * | 5/2007 | Koshiishi | ............... | B23K 9/092 219/130.51 |
| 2007/0151964 | A1 * | 7/2007 | Artelsmair | ............. | B23K 9/124 219/137.2 |
| 2007/0158324 | A1 | 7/2007 | O'Donnell et al. | | |
| 2007/0164074 | A1 * | 7/2007 | Schorghuber | .......... | B23K 9/133 226/108 |
| 2008/0053978 | A1 * | 3/2008 | Peters | ..................... | B23K 9/125 219/125.12 |
| 2010/0059492 | A1 | 3/2010 | Kawamoto et al. | | |
| 2011/0309062 | A1 * | 12/2011 | O'Donnell | ........... | B23K 9/0017 219/130.1 |
| 2012/0305532 | A1 * | 12/2012 | Harris | ................... | B23K 9/1735 219/76.14 |
| 2013/0015170 | A1 * | 1/2013 | Peters | ..................... | B23K 9/092 219/130.21 |
| 2013/0043219 | A1 * | 2/2013 | Peters | .................. | B23K 9/0671 219/72 |
| 2013/0048619 | A1 * | 2/2013 | Doyle | .................. | B23K 9/0286 219/122 |
| 2013/0193126 | A1 * | 8/2013 | Anderson | ............ | B65H 59/387 219/137.2 |
| 2013/0228559 | A1 | 9/2013 | Daniel | | |
| 2014/0027422 | A1 * | 1/2014 | Panelli | ................. | B23K 9/0216 219/125.1 |
| 2015/0021307 | A1 * | 1/2015 | Tanaka | ................. | B23K 9/1043 219/130.1 |
| 2015/0041448 | A1 * | 2/2015 | O'Donnell | ........... | B23K 9/1043 219/130.1 |
| 2015/0076119 | A1 * | 3/2015 | Hsu | ...................... | B23K 9/0216 219/74 |
| 2015/0217404 | A1 * | 8/2015 | Peters | .................. | B23K 26/242 219/121.64 |
| 2015/0273612 | A1 * | 10/2015 | Peters | .................. | B23K 26/342 219/121.65 |
| 2015/0283639 | A1 * | 10/2015 | Henry | ................. | B23K 35/0266 219/130.51 |
| 2015/0343552 | A1 * | 12/2015 | Gelmetti | ................ | B23K 9/133 219/137.71 |
| 2016/0288237 | A1 * | 10/2016 | Gelmetti | ................ | B23K 9/133 |
| 2017/0225253 | A1 * | 8/2017 | Matsuoka | ................ | B23K 9/09 |
| 2018/0178309 | A1 * | 6/2018 | Inoue | ..................... | B23K 9/323 |
| 2018/0236584 | A1 * | 8/2018 | Baba | ........................ | B23K 9/124 |
| 2019/0224772 | A1 * | 7/2019 | Kawai | .................... | B23K 9/133 |
| 2019/0247947 | A1 * | 8/2019 | Inoue | ................... | B23K 9/1075 |
| 2019/0283165 | A1 * | 9/2019 | Baba | ..................... | B23K 9/095 |
| 2019/0344370 | A1 * | 11/2019 | Hutchison | .............. | B23K 9/124 |

FOREIGN PATENT DOCUMENTS

| | | |
|---|---|---|
| CN | 101356038 A | 1/2009 |
| CN | 102371417 A | 3/2012 |
| CN | 103567635 A | 2/2014 |
| CN | 104271302 A | 1/2015 |
| CN | 104289792 A | 1/2015 |
| DE | 4320405 A1 | 12/1994 |
| DE | 19732379 A1 | 2/1999 |
| EP | 2949416 | * 12/2015 |
| EP | 2949416 A2 | 12/2015 |
| JP | S60-184470 A | 9/1985 |
| JP | H11-090627 A | 4/1999 |
| JP | H1190627 | * 4/1999 |
| JP | 2006-326679 A | 12/2006 |
| JP | 2007-229775 A | 9/2007 |

OTHER PUBLICATIONS

Translation JP 60184470 (Year: 2021).*
Translation DE19732379 (Year: 2021).*
Translation JP 11090627 (Year: 2021).*
Translation JP2006326679 (Year: 2021).*
Extended European Search Report for European Patent Application No. 17763381.5, dated Jul. 19, 2019, 8 pages.
English translation of International Search Report for PCT/JP2017/009487 dated Apr. 11, 2017.
First Office Action for Chinese Application No. 201780013913 9 dated Jul. 31, 2020, with its English translation, 17 pages.

(56) References Cited

OTHER PUBLICATIONS

Extended European Search Report for European Application No. 20170258.6 dated Aug. 5, 2020, 8 pages.
Third Office Action for Chinese Application No. 201780013913.9 dated Jul. 23, 2021, with its English translation, 18 pages.

* cited by examiner

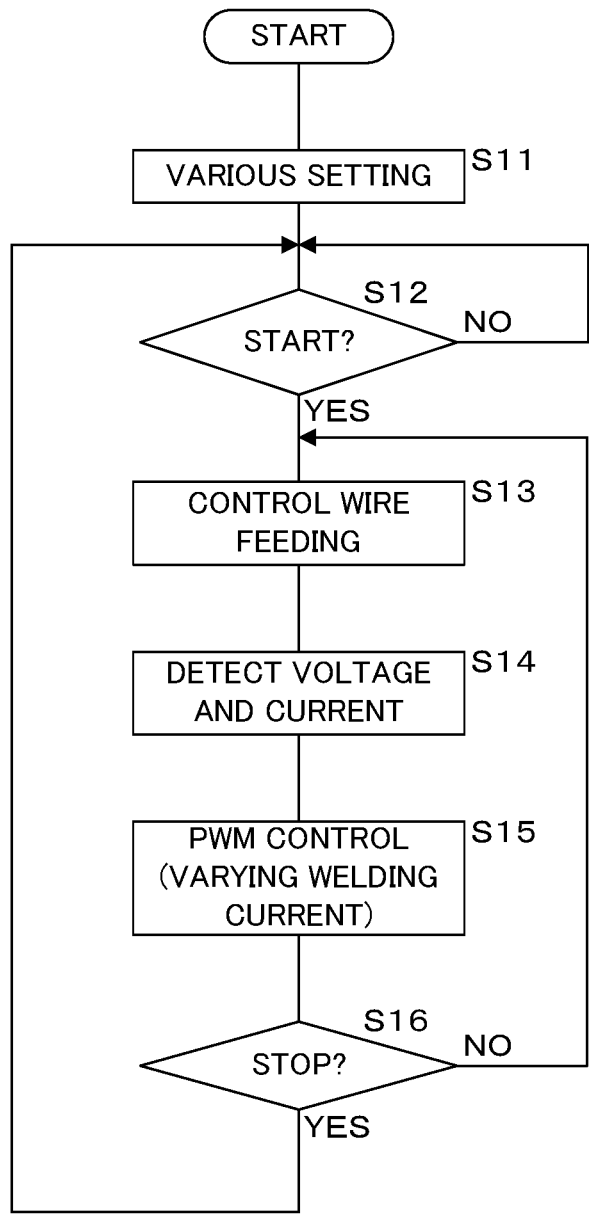

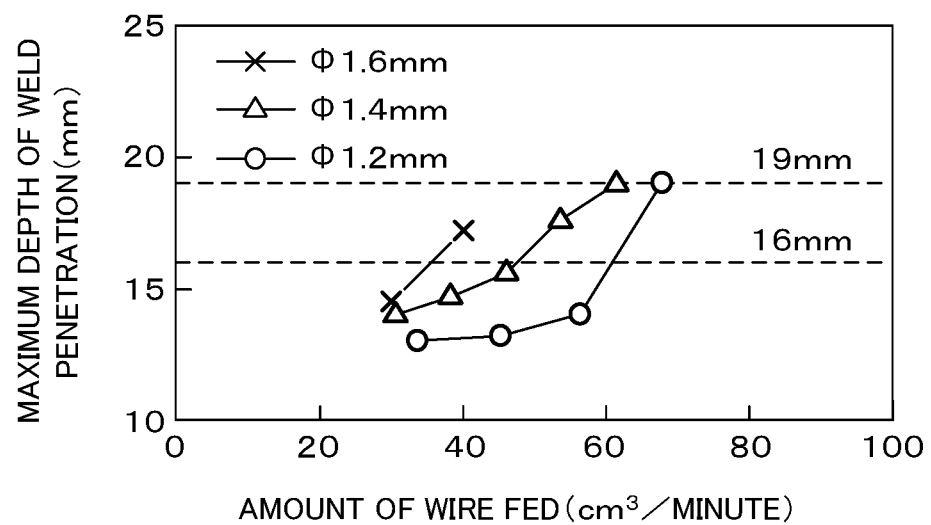
F I G. 6

ARC WELDING SYSTEM AND WIRE FEEDING DEVICE

CROSS-REFERENCE TO RELATED APPLICATIONS

This application is the national phase under 35 U.S.C. § 371 of PCT International Application No. PCT/JP2017/009487 which has an International filing date of Mar. 9, 2017 and designated the United States of America.

FIELD

The present invention relates to an arc welding system of a consumable electrode type and to a wire feeding device.

BACKGROUND

An arc welding system of the consumable electrode type is provided with: a wire feeding device that feeds welding wire from a wire feeding source to a welding torch; and a power supply device. The wire feeding device is provided with a pull-out feed roller configured to pull out welding wire from a wire feeding source such as a wire reel or a pack wire, and a push-out feed roller located at an arm or the like of a welding robot to push out welding wire fed from a wire feeding source to a welding torch. Joint between the pull-out feed roller and the push-out feed roller is made by a conduit cable through which the fed welding wire is inserted. The welding wire is guided by the conduit cable and is fed to the welding torch. The arc welding system controls the rotation of the pull-out feed roller and the push-out feed roller so as to feed welding wire to a welding torch while supplying electric power between the welding wire and a base material to generate arc which is used to weld the base material with its heat. A thin plate having the thickness of approximately 5 mm may be welded at the butt joint of the base material by a single pass.

For a thick plate having the thickness of 9 to 30 mm, however, the base material cannot be welded by a single pass in the conventional arc welding system. Thus, multi-layer welding in which welding operations are repeated multiple times is employed to weld a thick plate. The multi-layer welding, however, causes a problem of increase in the number of welding steps. This also raises other issues such as increased heat input, deformation of a base material and embrittlement of a welded portion.

The present inventors have conducted extensive study to solve such problems and found that single pass welding for a thick plate may be achieved by feeding welding wire at a higher speed compared to a general arc welding system so as to supply large current.

More specifically, single pass welding for a thick plate may be achieved by feeding the welding wire at approximately 5 to 100 meters per minute and supplying large current of 300 A or more. High-speed feeding of welding wire and supply of large current form a concave melted portion at the base material due to the heat of arc, and the tip end of the welding wire goes into the melted portion. By the tip end of the welding wire passing the surface of the base material and going deeper, the melted portion penetrates through the base material to the back surface thereof in the thickness direction, which allows for single pass welding. In the description below, arc generated between the base material or the melted portion and the tip end of the welding wire inserted into the melted portion will appropriately be referred to as buried arc.

SUMMARY

There are, however, various technical problems for achieving the practical use of the arc welding system that enables high-speed feeding of welding wire, supply of large current and so forth. For example, depending on the distance and arrangement between a wire feeding source and a welding torch, a feeding load such as inertia or feed resistance applied to welding wire at the time of feeding is increased, which makes it impossible to stably feed the welding wire from the wire feeding source to the welding torch at a high speed in the conventional arc welding system. More specifically, if the distance between the wire feeding source and the welding torch is long, the feeding load is increased. Furthermore, if a wire reel is used as the wire feeding source, the inertia of the wire reel increases the feeding load. Increase in the feeding load causes slippage between the welding wire and the roller, which makes it impossible to feed the welding wire at a predetermined speed to the base material and therefore to stably achieve single pass welding for a thick plate.

It is an object to provide an arc welding system and a wire feeding device capable of stably feeding welding wire to a welding torch at a predetermined speed so as to achieve single pass welding for a thick plate.

An arc welding system according to an aspect of the present disclosure is of a consumable electrode type provided with a wire feeding device that feeds welding wire from a wire feeding source to a welding torch and a power supply device that supplies electric power between a base material and the welding wire fed to the welding torch by the wire feeding device, and configured to weld a base material with arc generated between the welding wire and the base material by the supplied power. The wire feeding device is provided with an intermediate wire feeding source that is disposed between the wire feeding source and the welding torch and is configured to temporarily accommodate the welding wire fed from the wire feeding source and to feed the accommodated welding wire to the welding torch.

In the arc welding system according to another aspect of the present disclosure, the wire feeding device includes a first feeding part that feeds the welding wire at the wire feeding source to the intermediate wire feeding source, and a second feeding part that feeds the welding wire accommodated in the intermediate wire feeding source to the welding torch.

According to the present disclosure, the intermediate wire feeding source located between the wire feeding source and the welding torch may absorb the feeding load of the welding wire at the wire feeding source side and thereby reduce the feeding load of the welding wire at the welding torch side. This makes it possible to stably feed the welding wire to the welding torch at a predetermined speed so as to achieve single pass welding for a thick plate.

In the arc welding system according to another aspect of the present disclosure, the intermediate wire feeding source includes a detection unit that detects the accommodated amount of the welding wire, and further includes a feed control unit that controls feeding of the first feeding part so as to accommodate a predetermined amount of welding wire based on the detection result obtained by the detection unit.

According to the present disclosure, since a predetermined amount of welding wire is accommodated in the intermediate wire feeding source, the welding wire may stably be fed to the welding torch side even if the amount of the welding wire fed from the wire feeding source to the intermediate wire feeding source is temporarily decreased or increased due to the feeding load of the welding wire on the wire feeding source side.

In the arc welding system according to another aspect of the present disclosure, the intermediate wire feeding source includes a housing that accommodates the welding wire, the housing and the wire feeding source are connected to each other by a first conduit cable through which the welding wire is inserted, the housing and the second feeding part are connected to each other by a second conduit cable through which the welding wire is inserted, and the welding wire is guided by the first conduit cable as well as the second conduit cable and is fed to the welding torch via the intermediate wire feeding source.

According to the present disclosure, the welding wire itself that is fed from the wire feeding source and is sent out from the first conduit cable is accommodated in the housing. Therefore, a sufficient amount of welding wire may be accommodated in the housing. Furthermore, the housing accommodates the welding wire itself, the friction resistance between the welding wire and the conduit cable would not be a problem.

In the arc welding system according to another aspect of the present disclosure, the first feeding part is accommodated in the housing.

According to the present disclosure, as the first feeding part is accommodated in the housing of the intermediate wire feeding source, the accommodated amount of welding wire may more directly be controlled compared to the case where the first feeding part and the intermediate wire feeding source are formed separately. The first feeding part and the intermediate wire feeding source are integrally formed, which facilitates the user to construct the arc welding system.

In the arc welding system according to another aspect of the present disclosure, the load concerning the feed of the welding wire passing through the first conduit cable is larger than the load concerning the feed of the welding wire passing through the second conduit cable.

According to the present disclosure, a large feeding load concerning the first conduit cable may be absorbed, and the substantial feeding load of the welding wire on the welding torch side may be reduced to a small feeding load concerning the second conduit cable.

In the arc welding system according to another aspect of the present disclosure, the housing has a placement surface for placing the intermediate wire feeding source.

According to the present disclosure, the intermediate wire feeding source may be disposed at an arbitrary position on a floor or the like.

The arc welding system according to another aspect of the present disclosure is provided with a welding robot having an arm that holds the welding torch. The second feeding part is located at the arm of the welding robot, and the intermediate wire feeding source is arranged side by side with the welding robot.

According to the present disclosure, the intermediate wire feeding source is arranged side by side with the welding robot, and the second feeding part is located at the arm of the welding robot. Because of the small feeding load from the intermediate wire feeding source to the second feeding part, the size and weight of the second feeding part may be made smaller, which may reduce the load applied to the welding robot.

In the arc welding system according to another aspect of the present disclosure, the power supply device includes a first power supply and a second power supply that are connected in parallel and that supply power between the welding wire and the base material.

According to the present disclosure, the first power supply and the second power supply connected in parallel are used to supply large current between the welding torch and the base material.

In the arc welding system according to another aspect of the present disclosure, the first power supply controls the power supplied by the first power supply and the second power supply and the feed of welding wire by the wire feeding device.

According to the present disclosure, the first power supply controls the power supplied by itself and by the second power supply, and controls the feed of the welding wire by the first and second feeding parts. That is, the first power supply performs centralized control on the operation of the entire power supply device and the welding wire feeding device. Accordingly, the arc welding system may be controlled in a stable manner.

In the arc welding system according to another aspect of the present disclosure, the wire feeding device feeds welding wire at a speed at which the tip end of the welding wire goes into the concave melted portion formed at the base material by the arc generated between the welding wire and the base material, and the power supply device changes the welding current so that the frequency of welding current flowing between the welding wire and the base material is in a range from 10 Hz to 1000 Hz, the average current is 300 A or larger, and the current amplitude is 50 A or larger.

According to the present disclosure, the tip end of the welding wire goes into the concave melted portion, where buried arc is generated. More specifically, the tip end of the welding wire is surrounded by the melted portion, and arc is generated between the tip end and the bottom part as well as a side part of the melted portion. Although the base material melted by the heat of arc and the molten metal of the welding wire tend to flow in a direction in which the tip end of the welding wire is buried, they are pushed back by the power of arc, and are stabilized in the state where the tip end is surrounded by the melted portion.

While the molten metal in such a state has a risk of being coarsely corrugated, the molten metal is finely vibrated at a cycle higher than the coarse corrugation cycle by periodically varying the welding current with the frequency, average current and current amplitude that are described above, the molten metal may be finely vibrated at a cycle higher than the coarse corrugation cycle, which can prevent the molten metal from having coarse corrugation.

Furthermore, by periodically varying the welding current, the state of the molten metal may be switched periodically between the first state where arc is directed to the bottom part of the concave melted portion and the second state where arc is directed to a side part of the melted portion, which can suppress the corrugation of the molten metal. More specifically, by switching between the first state and the second state at a frequency in the range from 10 Hz to 1000 Hz, the molten metal may be finely vibrated at a frequency higher than the coarse corrugation frequency, which can suppress the coarse corrugation of the molten metal.

Moreover, under the welding condition with the frequency of welding current ranging from 50 Hz to 300 Hz, the average current ranging from 40 A to 1000 A and the current amplitude ranging from 100 A to 300 A, the molten metal may more effectively be prevented from corrugation.

In the arc welding system according to another aspect of the present disclosure, the wire feeding device feeds welding wire at a speed equal to or higher than 5 meters per minute.

According to the present disclosure, single pass welding for a thick plate by buried arc may be achieved by feeding the welding wire at a speed of 5 meters per minute or faster.

The wire feeding device according to another aspect of the present disclosure configured to feed welding wire from a wire feeding source to a welding torch is provided with: an intermediate wire feeding source that is disposed between the wire feeding source and the welding torch and is configured to temporarily accommodate the welding wire fed from the wire feeding source and to feed the accommodated welding wire to the welding torch; a first feeding part that feeds the welding wire in the wire feeding source to the intermediate wire feeding source; and a second feeding part that feeds the welding wire accommodated in the intermediate wire feeding source to the welding torch.

According to the present disclosure, the intermediate wire feeding source located between the wire feeding source and the welding torch may absorb the feeding load of the welding wire at the wire feeding source side and thereby reduce the feeding load of the welding wire at the welding torch side.

According to the present disclosure, welding wire may stably be fed to a welding torch at a predetermined speed so as to achieve single pass welding for a thick plate.

The above and further objects and features will more fully be apparent from the following detailed description with accompanying drawings.

BRIEF DESCRIPTION OF THE DRAWINGS

FIG. 3 is a flowchart illustrating a procedure of an arc welding method according to the embodiment;

FIG. 6 is a graph illustrating the relationship between the feeding amount of welding wire and the depth of weld penetration in butt welding by large-current buried arc;

DETAILED DESCRIPTION

The present disclosure will be described below in detail with reference to the drawings illustrating the embodiments thereof. At least some parts of the embodiments described below may arbitrarily be combined together.

Embodiment 1

Figure 1:
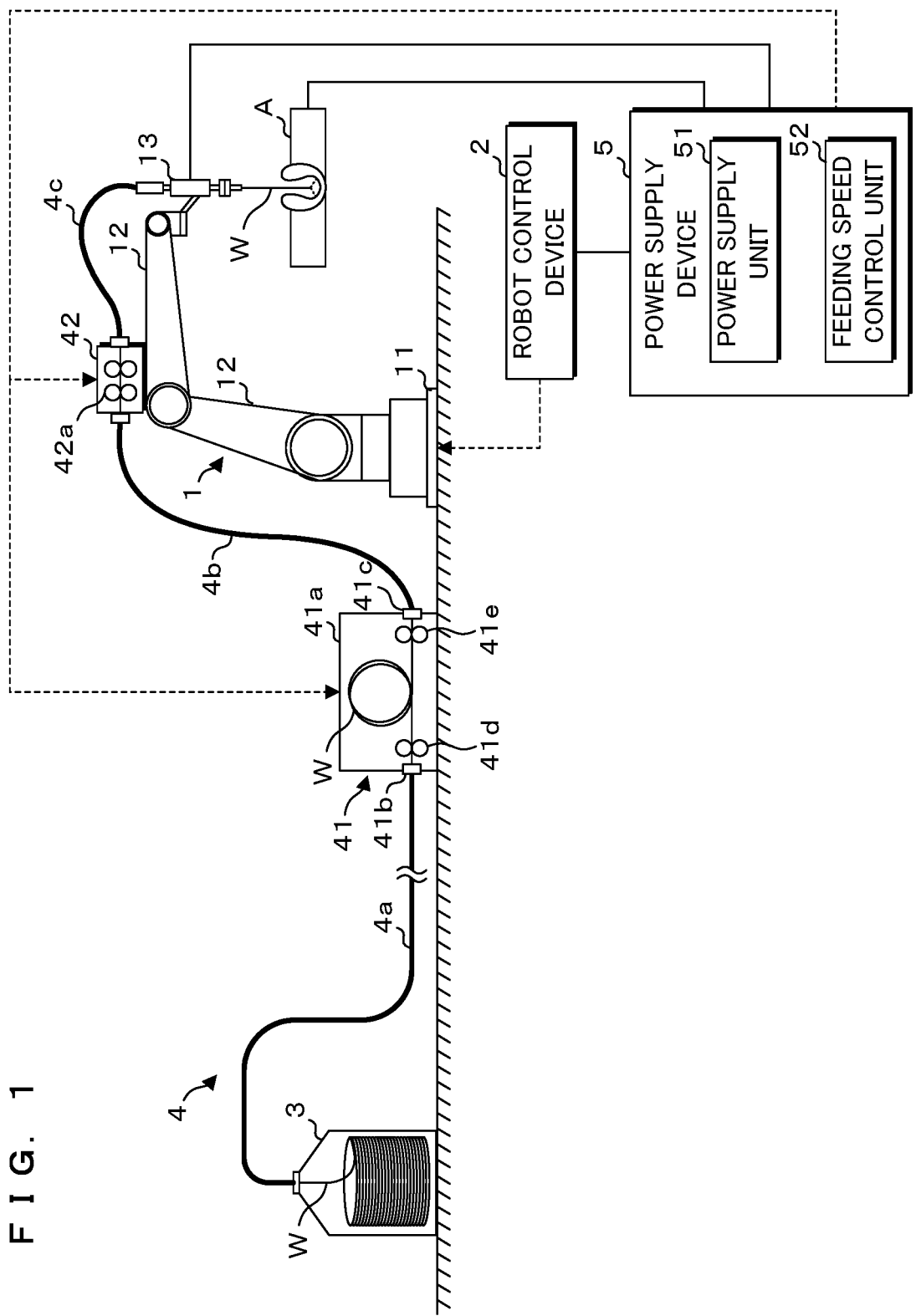
FIG. 1 is a schematic diagram illustrating a configuration example of an arc welding system according to Embodiment 1.
Figure 2:
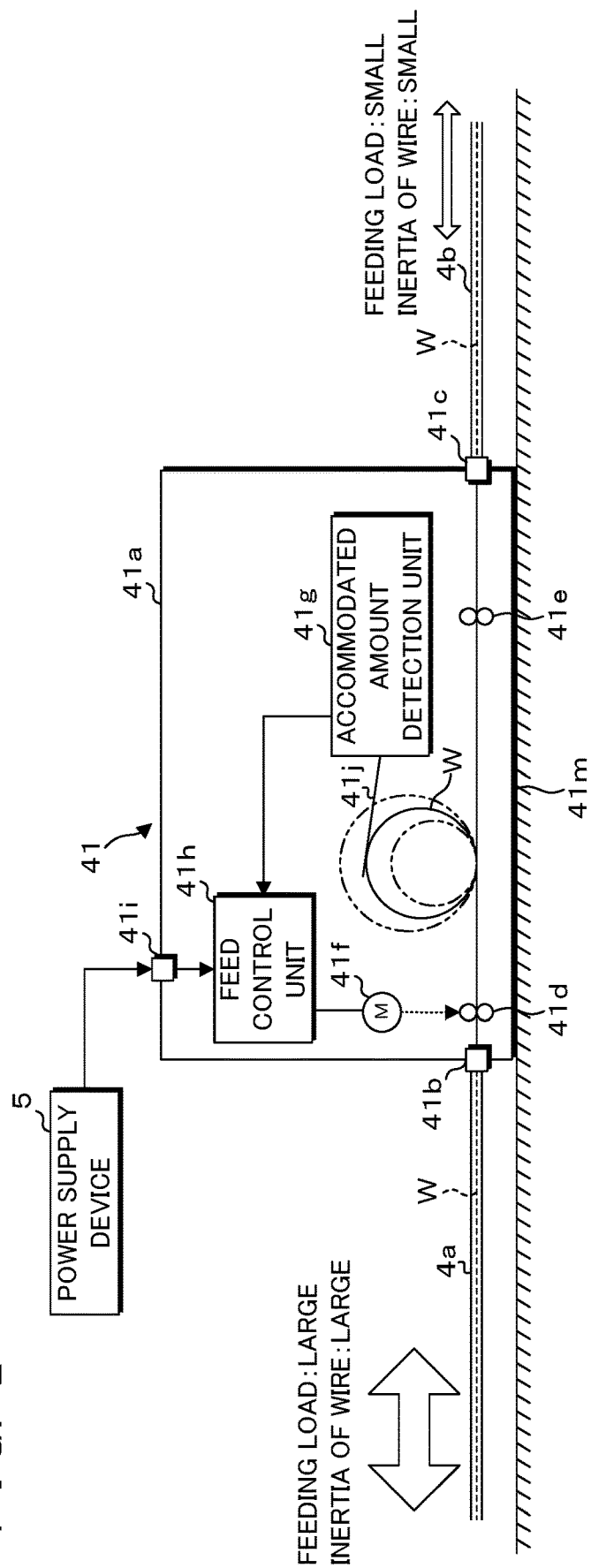
FIG. 2 is a schematic diagram illustrating a configuration example of an intermediate wire feeding source according to Embodiment 1.

FIG. 1 is a schematic diagram illustrating a configuration example of an arc welding system according to Embodiment 1. FIG. 2 is a schematic diagram illustrating a configuration example of an intermediate wire feeding source 41 according to Embodiment 1. The arc welding system according to the present embodiment is a gas shield arc welding machine of a consumable electrode type that is capable of butt welding a base material A having a plate thickness of 9 mm to 30 mm by a single pass, and includes: a welding robot 1, a robot control device 2, a wire feeding source 3, a wire feeding device 4 and a power supply device 5.

The welding robot 1 automatically performs arc welding of the base material A. The welding robot 1 includes a base 11 fixed to an appropriate position on a floor surface. To the base 11, multiple arms 12 are rotatably connected via shafts (not illustrated). A welding torch 13 is held at the distal end of the arm 12 connected at the distal end side. A motor is provided at the connecting portion of the arms 12, so that each arm 12 pivots around the shaft by the rotary drive force of the motor. The rotation of the motor is controlled by the robot control device 2. The robot control device 2 may move the welding torch 13 with respect to the base material A in the upper, lower, front, back, left and right directions by rotating the arms 12. Moreover, at the connecting portion of the arms 12, an encoder is located that outputs a signal indicating a rotated position of each arm 12 to the robot control device 2, which recognizes the position of the welding torch 13 based on the signal output from the encoder.

Figure 5:
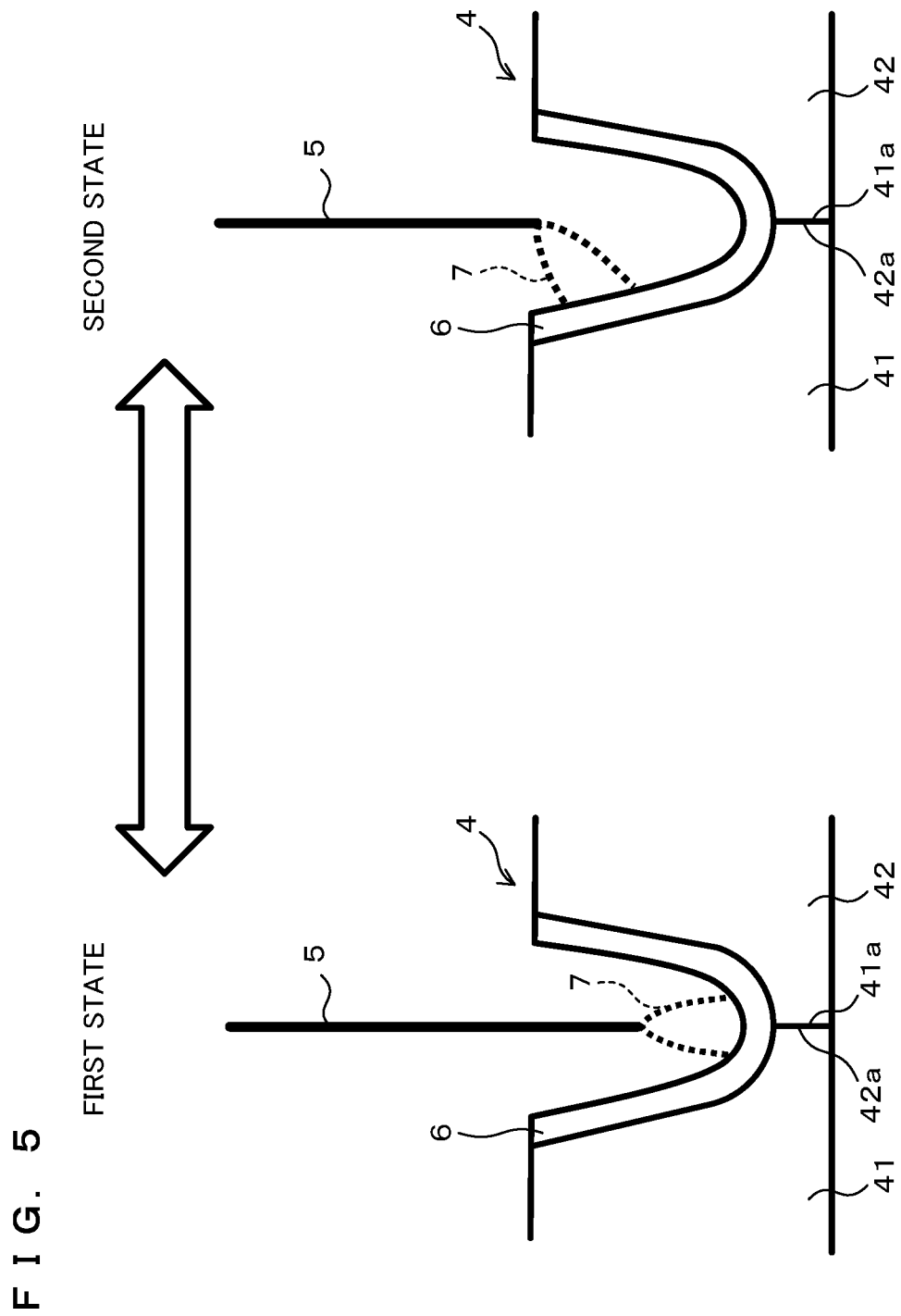
FIG. 5 is a schematic diagram illustrating an arc welding method according to the embodiment.

The welding torch 13 is made of conductive material such as copper alloy, and has a cylindrical contact chip which guides welding wire W to the base material A to be welded while supplying welding current required to generate arc 7 (see FIG. 5). The contact chip makes contact with welding wire W penetrating into the contact chip, and supplies welding current to the welding wire W. Moreover, the welding torch 13 has a hollow cylindrical shape surrounding the contact chip, and has a nozzle for spraying shield gas to the base material A through an opening at the tip end thereof. The shield gas is to prevent oxidation of the base material A melted by the arc 7 as well as the welding wire W. The shield gas is, for example, carbon dioxide gas, mixed gas containing carbon dioxide gas and argon gas, or inert gas such as argon. A water flow path for cooling the welding torch 13 with water is formed inside the contact chip and the nozzle. The contact chip and nozzle are connected with each other at the non-distal side, which is provided, on the outer side, with an inlet through which cooling water flows in and an outlet through which water passed through the water flow path flows out. The water flow path is a pathway from the inlet through the non-distal portion of the contact chip, the distal portion of the contact chip, the non-distal portion of the contact chip, the non-distal portion of the nozzle and the distal portion of the nozzle, to the outlet.

The wire feeding source 3 accommodates the welding wire W so as to veer out the welding wire W to the welding torch 13. The welding wire W is, for example, a solid wire having a diameter of 0.8 mm to 1.6 mm, and functions as a consumable electrode. The wire feeding source 3 is, for example, a pack wire. The pack wire includes a cylindrical housing in which the welding wire W helically coiled with its bottom end located at the bottom, and is configured to sequentially veer out the welding wire W through a hole (not illustrated) opened at the top end. The pack wire is an example of the wire feeding source 3, and may be a reel wire made by a winding of the welding wire W.

The wire feeding device 4 is provided with an intermediate wire feeding source 41 that is disposed between the wire feeding source 3 and the welding torch 13 and is configured to temporarily accommodate the welding wire W fed from the wire feeding source 3 and to feed the accommodated welding wire W to the welding torch 13. The intermediate wire feeding source 41 is to absorb the difference in the wire feeding speed between different parts in the feed path, and also to reduce the feeding load of the welding wire W on the welding torch 13 side. The intermediate wire feeding source 41 has a hollow substantially-rectangular-parallelepiped housing 41a that accommodates the welding wire W. The housing 41a has a flat placement surface 41m that can be placed at a location such as on a floor. At the housing 41a, an inlet part 41b through which the welding wire W fed from the wire feeding source 3 is introduced and an outlet part 41c through which the welding wire W accommodated inside the housing 41a is sent out are formed.

The wire feeding source 3 and the inlet part 41b of the intermediate wire feeding source 41 are connected via a first conduit cable 4a through which the welding wire W passes. At the inlet part 41b inside the housing 41a, a pull-out feeding part 41d (first feeding part) is provided, which pulls out the welding wire W from the wire feeding source 3 and pulls the welding wire W into the housing 41a through the inlet part 41b. The pull-out feeding part 41d has a pair of rollers that are opposed to each other at positions where the rollers can hold the welding wire W introduced through the inlet part 41b between them. At least one of the rollers is rotary driven by a pull-out feeding motor 41f which is capable of controlling the speed. The pull-out feeding part 41d may feed the welding wire W at a speed of 100 meters per minute, for example. The pull-out feeding part 41d rotates the rollers based on a feed control signal output from the power supply device 5.

The welding wire W pulled into the housing 41a from the first conduit cable 4a through the inlet part 41b is bent into an arbitrary shape, and a predetermined amount of welding wire W is accommodated into the housing 41a. In the example illustrated in FIG. 1, the welding wire W is accommodated while being bent into loops. It is noted that a member for guiding the welding wire W may be provided inside the housing 41a so that the welding wire W is accommodated in a predetermined spatial area without being entangled.

At the outlet part 41c inside the housing 41a, a wire guiding part 41e is provided, which guides the welding wire W accommodated inside the intermediate wire feeding source 41 and sends out the welding wire W to the outside the housing 41a through the outlet part 41c. The wire guiding part 41e has a pair of rollers that are opposed to each other at positions where the rollers can hold the welding wire W between them and guide it to the outlet part 41c. The rollers may be configured to be rotary driven by a motor which rotates in synchronization with the pull-out feeding motor 41f, or be passively rotated.

Moreover, the wire feeding device 4 is provided with a push feeder 42 that pulls out the welding wire W from the intermediate wire feeding source 41 and pushes out the pulled-out welding wire W to the welding torch 13. The push feeder 42 is located, for example, at the arm 12 of the welding robot 1. The push feeder 42 is connected to the outlet part 41c of the intermediate wire feeding source 41 by a second conduit cable 4b through which the welding wire W passes, and is connected to the welding torch 13 by a third conduit cable 4c. The intermediate wire feeding source 41 is arranged side by side with and in the vicinity of the welding robot 1. The push feeder 42 includes a push-out feeding part 42a (second feeding part) that pulls out the welding wire W from the intermediate wire feeding source 41 and pushes out the pulled-out welding wire W to the welding torch 13. The push-out feeding part 42a has a pair of rollers that are opposed to each other at positions where the rollers can hold the welding wire W between them. At least one of the rollers is rotary driven by a pull-out feeding motor (not illustrated) which is capable of controlling the speed. The push-out feeding part 42a may feed the welding wire W at a speed of 100 meters per minute, for example. The push-out feeding part 42a rotates the rollers based on a feed control signal output from the power supply device 5.

Furthermore, the intermediate wire feeding source 41 includes an accommodated amount detection unit 41g that detects the accommodated amount of the welding wire W, a feed control unit 41h that controls the rotation of the pull-out feeding motor 41f, and a control signal input unit 41i to which a feed control signal output from the power supply device 5 is input.

The accommodated amount detection unit 41g includes, for example, a bar member 41j which has one end rotatably fixed and the other end making contact from the outer circumferential side with the circular arc portion of the welding wire W accommodated in a loop-like form and a rotary position sensor which detects the rotational position of the bar member 41j. If the accommodated amount of the welding wire W is increased or decreased, the diameter of the loop of the welding wire W accommodated inside the housing 41a changes as illustrated by the two-dot chain lines in FIG. 2, and the bar member 41j pivots around the one end described above. The rotary position sensor may detect the rotational position of the bar member 41j to detect the accommodated amount of the welding wire W, and output the detection result to the feed control unit 41h.

It is noted that the accommodated amount detection unit 41g provided with the rotary position sensor is a mere example, and the accommodated amount of welding wire W may be optically detected with the use of an infrared sensor or the like. Moreover, a limit switch which is in contact with the accommodated welding wire W and is turned on or off in accordance with the accommodated amount of the welding wire W may also be used to configure the accommodated amount detection unit 41g.

The feed control unit 41h corrects the feed control signal input to the control signal input unit 41i based on the detection result obtained by the accommodated amount detection unit 41g, and accommodates a predetermined amount of welding wire W into the housing 41a by controlling the rotation of the pull-out feeding motor 41f in accordance with the corrected feed control signal.

For example, if the accommodated amount of the welding wire W is less than a predetermined amount, the feed control unit 41h rotates the pull-out feeding motor 41f at a speed higher than the rotational speed instructed by the feed control signal. Moreover, if the accommodated amount of the welding wire W is more than the predetermined amount, the feed control unit 41h rotates the pull-out feeding motor 41f at a speed lower than the rotational speed instructed by the feed control signal.

The power supply device 5 is connected to the contact chip of the welding torch 13 and the base material A via the power supply cable, and includes a power supply unit 51 that supplies welding current and a feeding speed control unit 52 that controls the feeding speed of the welding wire W. The power supply unit 51 includes a power supply circuit that outputs PWM-controlled direct current, a signal processing unit that controls the operation of the power supply circuit, a voltage detection unit, a current detection unit, and so forth.

The voltage detection unit detects voltage applied to the welding torch 13 and the base material A, and outputs a voltage value signal indicating the detected voltage value to the signal processing unit.

The current detection unit detects, for example, welding current supplied from the power supply device 5 to the welding wire W via the welding torch 13 and flows through the arc 7, and outputs a current value signal indicating the detected current value to the signal processing unit.

The signal processing unit outputs a signal for performing PWM control on the power supply circuit to the power supply circuit based on a voltage value signal, a current value signal and a set value for welding conditions, and so forth.

The power supply circuit includes, for example, an AC-DC converter performing AC-DC conversion on commercial alternating current, an inverter circuit converting direct current subjected to AC-DC conversion into desired alternating current by switching, and a rectification circuit rectifying the alternating current obtained by conversion. The power supply circuit performs PWM control on the inverter circuit in accordance with the signal output from the signal processing unit, and outputs predetermined welding current and voltage to the welding wire W. For example, welding voltage that varies periodically is applied between the base material A and the welding wire W, and the welding current flows. The power supply device 5 is so configured that an output instruction signal is input thereto from the robot control device 2 via a control communication line, and the power supply unit 51 starts supplying welding current to the power supply circuit while the output instruction signal serves as a trigger.

FIG. 3 is a flowchart illustrating a procedure of an arc welding method according to the present embodiment. First, a pair of base materials A to be joined by welding are placed at the arc welding device, and various settings are performed for the power supply device 5 (step S11). More specifically, a first base material A1 and a second base material A2 having a plate-like shape (see FIG. 5) are prepared and disposed in a predetermined welding work position by making end faces a1 and a2 that are to be welded face each other. The first base material A1 and the second base material A2 are steel plates made of, for example, soft steel, carbon steel for machine structural use or alloy steel for machine structural use, having a thickness in a range from 9 mm to 30 mm.

The power supply device 5 then sets the welding condition of welding current within a range at the frequency of 10 Hz to 1000 Hz, the average current of 300 A or larger and the current amplitude of 50 A or higher.

The conditions for welding current may be set by a welding worker entirely, or the power supply device 5 may accept implementation of the welding method according to the present embodiment through an operation unit so as to set all the conditions automatically. Furthermore, the power supply device 5 may accept a part of the welding conditions such as average current through the operation unit and determine the rest of the welding conditions conforming to the accepted part of the welding conditions so as to semi-automatically set the conditions.

After various settings are performed, the power supply device 5 determines whether or not the condition for starting output of the welding current is satisfied (step S12). More specifically, the power supply device 5 determines whether or not an output instruction signal for welding is input. If it is determined that no output instruction signal is input and the output starting condition of welding current is not satisfied (step S12: NO), the power supply device 5 waits in the state of waiting input of an output instruction signal.

If it is determined that the condition for starting output of welding current is satisfied (step S12: YES), the feeding speed control unit 52 of the power supply device 5 outputs to the wire feeding device 4 a feed control signal for instructing to feed wire, so that the welding wire W is fed at a predetermined speed (step S13). The feeding speed of the welding wire W is set within the range of, for example, approximately 5 to 100 meters per minute. Preferably, the welding wire W may preferably be fed at a speed of 5 meters per minute or higher. The buried arc state may be maintained well. The feeding speed control unit 52 decides the feeding speed in accordance with the average current setting signal output from the average current setting circuit. It may also be configured that a welding worker may directly set the feeding speed of wire.

Subsequently, the power supply unit 51 of the power supply device 5 detects welding voltage and welding current at the voltage detection unit and the current detection unit (step S14), and performs PWM control so that the frequency, current amplitude and average current for the detected welding current corresponds to the set welding conditions and the welding current periodically varies (step S15).

Here, welding may be performed in the state where the external characteristic of the power supply device 5, that is, the rate of change in the voltage with respect to the rate of change in the welding current is in the range from −40V/100 A to −2V/100 A. When welding is performed with such an external characteristic, it is easy to maintain the buried arc state. If the lowered voltage with respect to the increase in the welding current is less than 2V, variation in the voltage is small, while variation in current is large with respect to the variation in the arc length due to a disturbance cause. This results in large fluctuation in the melted region, making it difficult to maintain the state of the buried arc 7. Moreover, if the lowered voltage exceeds 40V, the self-regulating action in the arc length is decreased, making it difficult to maintain the buried arc state.

Subsequently, the power supply unit 51 of the power supply device 5 determines whether or not the output of welding current is stopped (step S16). More specifically, the power supply device 5 determines whether or not an input of the output instruction signal continues. If it is determined that the input of the output instruction signal continues and the output of welding current is not stopped (step S16: NO), the power supply unit 51 returns the processing to step S13 and continues outputting welding current.

If it is determined that the output of the welding current is stopped (step S16: YES), the power supply unit 51 returns the processing to step S12.

Figure 4A:
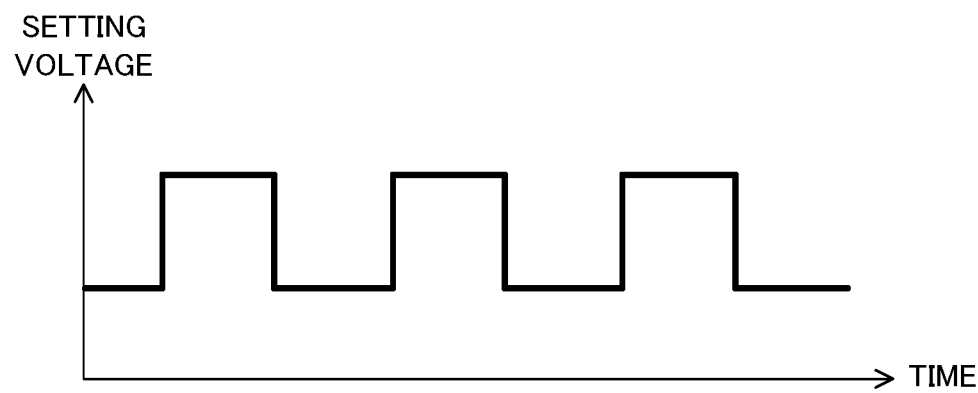
FIG. 4A is a graph illustrating a variation of set voltage.
Figure 4B:
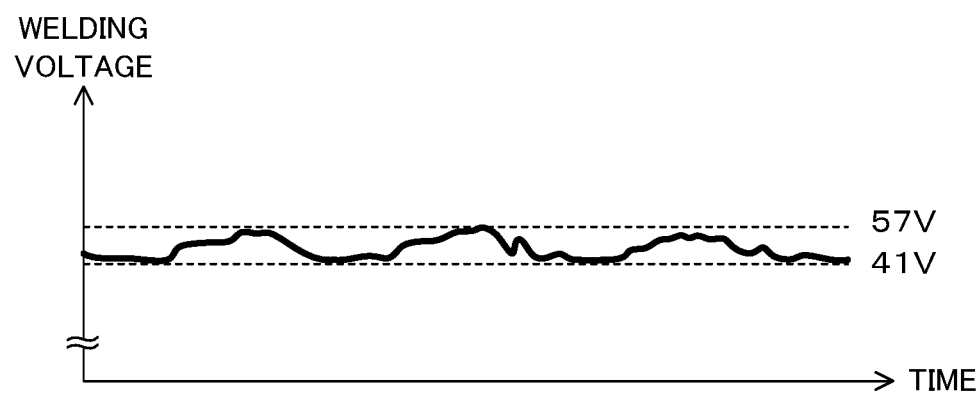
FIG. 4B is a graph illustrating a variation of welding voltage.
Figure 4C:
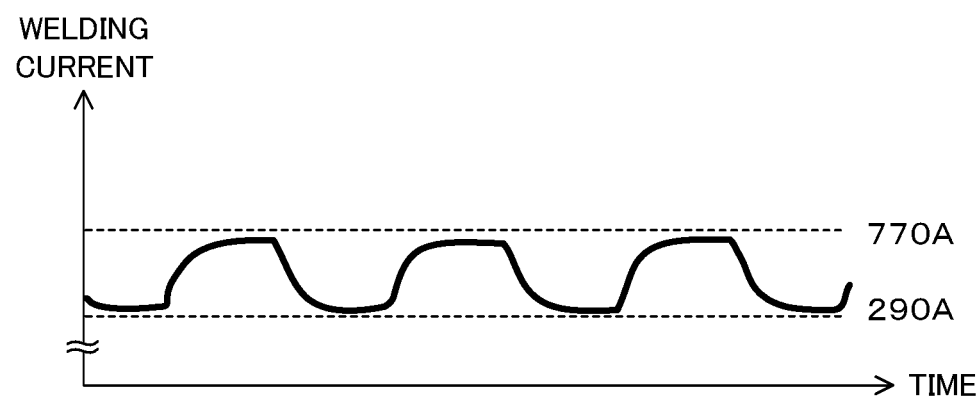
FIG. 4C is a graph illustrating a variation of welding current.

FIGS. 4A, 4B and 4C are graphs illustrating variation in set voltage, welding voltage and welding current. FIG. 5 is a schematic diagram illustrating an arc welding method according to the present embodiment. The horizontal axis in each graph illustrated in FIGS. 4A to 4C indicates time, whereas the vertical axes in the graphs illustrated in FIGS. 4A to 4C indicate set voltage for the power supply device 5, welding voltage between the base material A and the welding wire W, and welding current flowing through the arc 7, respectively.

In the arc welding method according to the present embodiment, the power supply unit 51 controls the welding current such that the frequency thereof ranges from 10 Hz to 1000 Hz, the average current is 300 A or larger and the current amplitude is 50 A or higher.

Preferably, the power supply unit 51 controls the welding current such that the frequency thereof ranges from 50 Hz to 300 Hz, the average current ranges from 400 A to 1000 A, and the current amplitude ranges from 100 A to 300 A.

More preferably, the power supply unit 51 controls the welding current such that the frequency of the power supply device 5 ranges from 100 Hz to 200 Hz, the current amplitude ranges from 200 A to 300 A, and the average current ranges from 500 A to 800 A, as illustrated in FIG. 4C. Under the welding conditions for welding current as described above, for example, if the diameter of the welding wire W is assumed as 1.2 mm, the welding wire W may be fed at the speed of approximately 40 meters per minute. In the case where the welding current and the wire feeding speed are set as described above, the set voltage is assumed as rectangular wave-like voltage with the frequency of 100 Hz and voltage amplitude of 30V as illustrated in FIG. 4A, while the welding voltage as illustrated in FIG. 4B is applied between the welding wire W and the base material A, and welding current as illustrated in FIG. 4C flows. The power supply device 5 performs control on the set voltage with the frequency of 100 Hz so that the welding current has the current amplitude of 240 A and the average current of 530 A, for example. Furthermore, the power supply device 5 controls feeding of the welding wire W at the speed of approximately 40 meters per minute. While the welding voltage varies in the range from 27V to 41V, the variation range in the welding voltage changes due to the influence of various impedances.

If the welding current is periodically changed under such welding conditions, a concave melted portion 6 is formed at the base material A, which is made of the molten metal of the welding wire W and the base material A melted by the heat of the arc 7 generated between the tip end of the welding wire W and a to-be-welded portion. The arc 7 is then photographed with a high-speed camera, to find that its state is periodically changed between the first state where the arc 7 is generated between the tip end of the welding wire W and the bottom part of the melted portion 6, and the second state where the arc 7 is generated between the tip end and a side part of the melted portion 6.

More specifically, the state is repeatedly switched between the first state where the arc 7 is directed from the tip end of the welding wire W to the bottom part of the melted portion 6 and the second state where the arc 7 is directed from the tip end of the welding wire W to a side part of the melted portion 6. Although the molten metal tends to flow in the direction in which the tip end of the welding wire W is buried, the arc 7 is directed to a side wall part of the melted portion 6 in the second state, the molten metal of the melted portion 6 is pushed back in the direction away from the welding wire W, and the melted portion 6 is stabilized in a concave state. In the right view in FIG. 5, the tip end of the melted welding wire W falls into a molten pool located at the bottom part of the melted portion 6 and is thereby shortened.

The first state and the second state are switched from each other at a frequency ranging from 100 Hz to 200 Hz, which allows micro vibration of molten metal to occur at a frequency higher than the large corrugation frequency, preventing the molten metal from having coarse corrugation.

As described above, with the arc welding method and the arc welding device according to the present embodiment, even in the case where gas shield arc welding is performed using large current of 300 A or higher, corrugation of molten metal may be suppressed by periodically varying welding current, which can prevent disturbance and drooping of a bead from occurring.

While the present embodiment described a case where the period during which welding current and welding voltage are large and the period during which they are small are substantially the same, the percentage of such periods may be different from each other. By changing the percentage of the periods, the breadth of the vertical displacement of the tip end of the welding wire W may be adjusted while suppressing corrugation of the molten metal. For example, by increasing the percentage of the period with large welding current and welding voltage, the tip end of the welding wire W is more likely to be held at a position higher than the bottom part of the melted portion 6. As a result, the amount of heat input to the upper part of the base material A may be increased and thus bead forming ability may be improved.

FIG. 6 is a graph illustrating the relationship between the feeding amount of welding wire W and the depth of weld penetration in the butt welding by large current buried arc 7. The horizontal axis represents the amount of wire fed per minute whereas the vertical axis represents the maximum depth of weld penetration. The graph with circled plots, the graph with triangle plots and the graph with x plots represent experimental results showing the relationship between the fed amount of wire and the depth of weld penetration at the time of using the welding wire W with the wire diameters of 1.2 mm, 1.4 mm and 1.6 mm, respectively.

The experimental conditions will be described below. The welding wire W employed are YGW11 with the wire diameters of 1.2 mm and 1.4 mm, and YGW12 with the wire diameter of 1.6 mm. The welding speed is 30 cm per minute. The distance between the contact chip and the base material A is 25 mm, and the shield gas is carbon dioxide. The external characteristic is −10V/100 A. Voltage varying with the voltage amplitude of ±10V and the frequency of 100 Hz is then applied between the welding torch 13 and the base material A.

The graph in FIG. 6 shows that the weld penetration per wire feeding amount is deeper as the wire diameter is increased. Moreover, at the wire diameters of 1.2 mm and 1.4 mm with which comparatively stable bead formation may be obtained, the depth of maximum weld penetration of approximately 16 mm to 19 mm may be obtained. Meanwhile, such a tendency is observed that the increase in the wire diameter lowers the upper limit of the amount of wire feeding which can stably maintain large current buried arc 7.

Figure 7A:
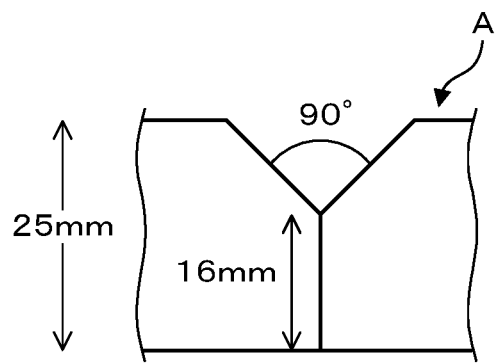
FIG. 7A is a schematic view illustrating the cross-section of a base material to be welded.
Figure 7B:
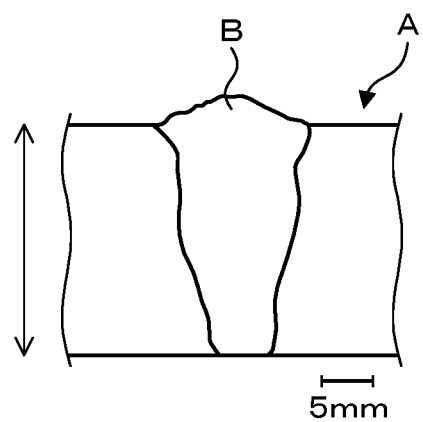
FIG. 7B is a schematic view illustrating the cross-section of a bead portion after welding.
Figure 7C:
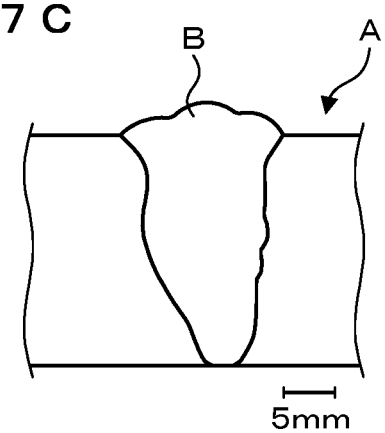
FIG. 7C is a schematic view illustrating the cross-section of a bead portion after welding.

FIGS. 7A, 7B and 7C are schematic views illustrating the cross-section of the base material A to be welded and a bead portion after welding. FIG. 7A is a schematic view illustrating the cross-section of the base material A to be welded by butt welding. The base material A is a thick plate with the thickness of 25 mm and has a Y groove. The groove angle of the Y groove is 90 degrees and the dimension of a root face corresponds to 16 mm.

FIG. 7B illustrates the cross section of a bead B obtained by butt welding at the mean current of 720 A, average voltage of 47V, voltage amplitude of ±10V, frequency of 100 Hz and external characteristic of −10V/100 A.

FIG. 7C illustrates the cross section of a bead B obtained by butt welding at the mean current of 720 A, average voltage of 47V, voltage amplitude of ±10V, frequency of 100 Hz and external characteristic of −20V/100 A.

Though it is possible to implement pierce welding under the welding conditions illustrated in FIG. 7B, incomplete fusion is slightly seen at the groove part. Meanwhile, under the welding condition in FIG. 7C, pierce welding without incomplete fusion or gas pore defects may be carried out. Furthermore, the end of the bead B is uniformly aligned along the welding direction, and thus a stable welding result may be obtained.

While the example described above illustrated an implementation of the buried arc 7 by periodically changing the welding current and voltage at 100 Hz, the control method for the welding current and voltage is not specifically limited.

For example, welding may be performed while periodically switching between the first state where the feeding speed of the welding wire W, welding current and voltage are high and the second state where the feeding speed of the welding wire W, welding current and voltage are low. For example, welding may be performed while switching between the first state where the feeding speed of the welding wire W is 50 m/minute, the welding current is 620 A and the voltage is 55V, and the second state where the feeding speed of the welding wire W is 60 m/minute, the welding current is 700 A and the voltage is 64V at a frequency in the range from 0.2 to 2 Hz. In the first state, a liquid drop concerning welding has a transition form of drop transition or transition in which the arc rotates while moving back and forth on the same plane like a pendulum, resulting in deeper penetration of the welding wire W. In the second state, a liquid drop has a rotating transition, resulting in shallower penetration of the welding wire W.

Moreover, the welding voltage may be fixed while the welding current and the feeding speed of the welding wire W are periodically changed when welding is performed.

The following welding conditions may appropriately be utilized that make it possible to perform pierce welding of the base material A by maintaining the buried arc state.

Under the welding conditions of the wire feeding speed of 25 meters/minute, the current value of 400 A, the voltage value of 35V, the external characteristic of −10V to −20V/100 A, the wire protruding length of 25 mm and the wire feeding speed of 30 meters/minute, a thick plate with the thickness of 9 mm may be welded by pierce welding.

Moreover, under the welding conditions of the wire feeding speed of 30 meters/minute, the current value of 450 A, the voltage value of 39V, the external characteristic of −10V to −20V/100 A, the wire protruding length of 25 mm and the wire feeding speed of 30 meters/minute, a thick plate with the thickness of 12 mm may be welded by pierce welding.

Furthermore, under the welding conditions of the wire feeding speed of 40 meters/minute, the current value of 550 A, the voltage value of 52V, the external characteristic of −20V/100 A, the wire protruding length of 25 mm and the wire feeding speed of 30 meters/minute, a thick plate having the thickness of 16 mm may be welded by pierce welding.

Furthermore, under the welding conditions of the wire feeding speed of 50 meters/minute, the current value of 770 A, the voltage value of 57V, the external characteristic of −20V/100 A, the wire protruding length of 15 mm and the wire feeding speed of 30 meters/minute, a thick plate with the thickness of 19 mm may be welded by pierce welding.

While the example where the base material A having a Y groove is butt-welded has been described, a base material A having a single bevel groove, I groove or any other groove may also be welded. It is also possible to weld the base material A with no groove. While the butt joint has been described as an example of butt welding, the joint form of welding is not particularly limited.

With the arc welding system according to Embodiment 1, the feeding load of the welding wire W on the welding torch 13 side may be reduced. This makes it possible to stably feed the welding wire W to the welding torch 13 at a required speed so as to achieve single pass welding for a thick plate.

Moreover, the amount of the welding wire W accommodated in the housing 41a is monitored so as to accommodate a predetermined amount of welding wire W in the intermediate wire feeding source 41, which enables stable feeding of the welding wire W from the intermediate wire feeding source 41 to the welding torch 13.

Furthermore, the welding wire W itself is accommodated in the housing 41a of the intermediate wire feeding source 41, so that a sufficient amount of welding wire W necessary for stable feeding of the welding wire W may more preferably be accommodated, compared to a cushioning mechanism configured by simply bending a conduit cable.

Furthermore, as the housing 41a accommodates the welding wire W itself, the friction resistance between the welding wire W and the conduit cable would not be a problem, allowing the welding wire W to be fed to the welding torch 13 at a reduced load.

In addition, even in the case where the feeding load of the welding wire W between the wire supply source 3 and the intermediate wire feeding source 41 is large, the welding wire W may stably be fed from the intermediate wire feeding source 41 to the welding torch 13. For example, even in the case where the wire feeding source 3 is located at a position distant from the welding robot 1 and thus the first conduit cable 4a is long, the welding wire W may stably be fed to the welding torch 13.

Furthermore, the intermediate wire feeding source 41 is so configured that can be put on a flat surface such as a floor, and therefore may freely be placed at any position between the wire feeding source 3 and the welding torch 13.

While Embodiment 1 described the example where the pull-out feeding part 41d is located inside the housing 41a of the intermediate wire feeding source 41, the pull-out feeding part 41d and the intermediate wire feeding source 41 may also be formed as separate units. The position of the separate pull-out feeding part 41d is not necessarily limited, and may be located at the wire feeding source 3.

While the example where the intermediate wire feeding source 41 is arranged side by side with the welding robot 1 was described, the position of the intermediate wire feeding source 41 is not particularly limited but may be at the arm 12 of the welding robot 1.

Embodiment 2

Another example of the intermediate wire feeding source 141 will now be described that is suitable for high-speed feeding of the welding wire W.

Figure 8:
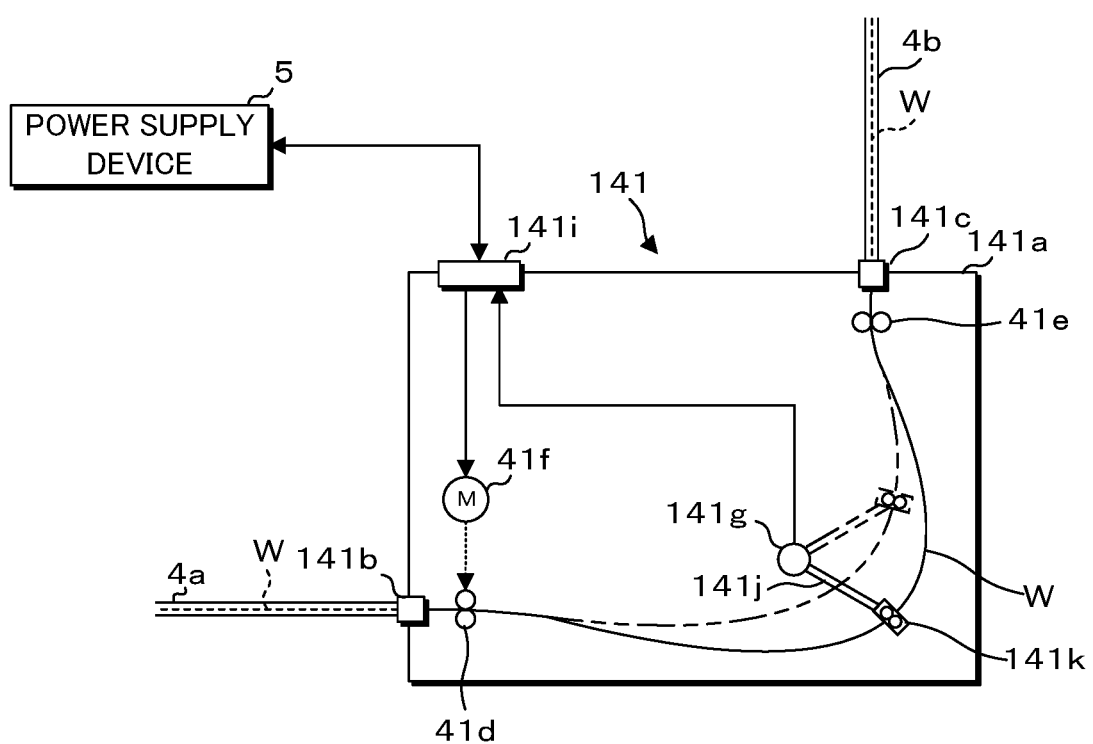
FIG. 8 is a schematic diagram illustrating a configuration example of an intermediate wire feeding source according to Embodiment 2.

FIG. 8 is a schematic diagram illustrating a configuration example of an intermediate wire feeding source 141 according to Embodiment 2. The intermediate wire feeding source 141 according to Embodiment 2 has a housing 141a similar to that in Embodiment 1, and is provided with an inlet part 141b at the side face of the housing 141a, through which the welding wire W fed from the wire feeding source 3 is introduced in a horizontal direction (first direction), and with an outlet part 141c at the upper face of the housing 141a, through which the welding wire W accommodated inside the housing 141a is sent out in an upward perpendicular direction crossing the horizontal direction. The welding wire W pulled into the housing 141a is accommodated in a state of being bent in an arc-like form between the inlet part 141b and the outlet part 141c.

The accommodated amount detection unit 141g according to Embodiment 2 is provided with a bar member 141j with one end rotatably fixed thereto. At the other end of the bar member 141j, a pair of curvature detection rollers 141k that hold the bent portion of the welding wire W between them are rotatably supported. If the accommodated amount of the welding wire W is increased or decreased, the curvature of the welding wire W accommodated in the housing 141a changes as illustrated in FIG. 8, and the bar member 141j pivots around the one end described above. The accommodated amount detection unit 141g is a rotary position sensor that detects the rotational position of the bar member 141j, and by detecting the rotary position of the bar member 141j, the accommodated amount detection unit 141g can detect the accommodated amount of the welding wire W, and outputs a signal indicating the accommodated amount to the power supply device 5 via the input/output unit 141i. The power supply device 5 receives the signal output from the intermediate wire feeding source 141, and outputs a feed control signal calculated based on the received signal to the intermediate wire feeding source 141.

The feed control signal output from the power supply device 5 is input to the input/output unit 141i of the intermediate wire feeding source 141. The pull-out feeding motor 41f rotates at a speed according to the feed control signal, and a predetermined amount of welding wire W is accommodated in the housing 141a.

According to Embodiment 2, the welding wire W is accommodated into the intermediate wire feeding source 141 in the state of being bent in an arc-like form between the inlet part 141b and the outlet part 141c. Therefore, compared to the case where the welding wire W is largely bent in loops and is accommodated into the housing 141a, the feeding load may be reduced. Compared to the case where the welding wire W is accommodated in loops, the internal structure of the housing 141a may be simplified.

Embodiment 3

A preferable configuration example of the power supply device 5 that can output large current is now described.

Figure 9:
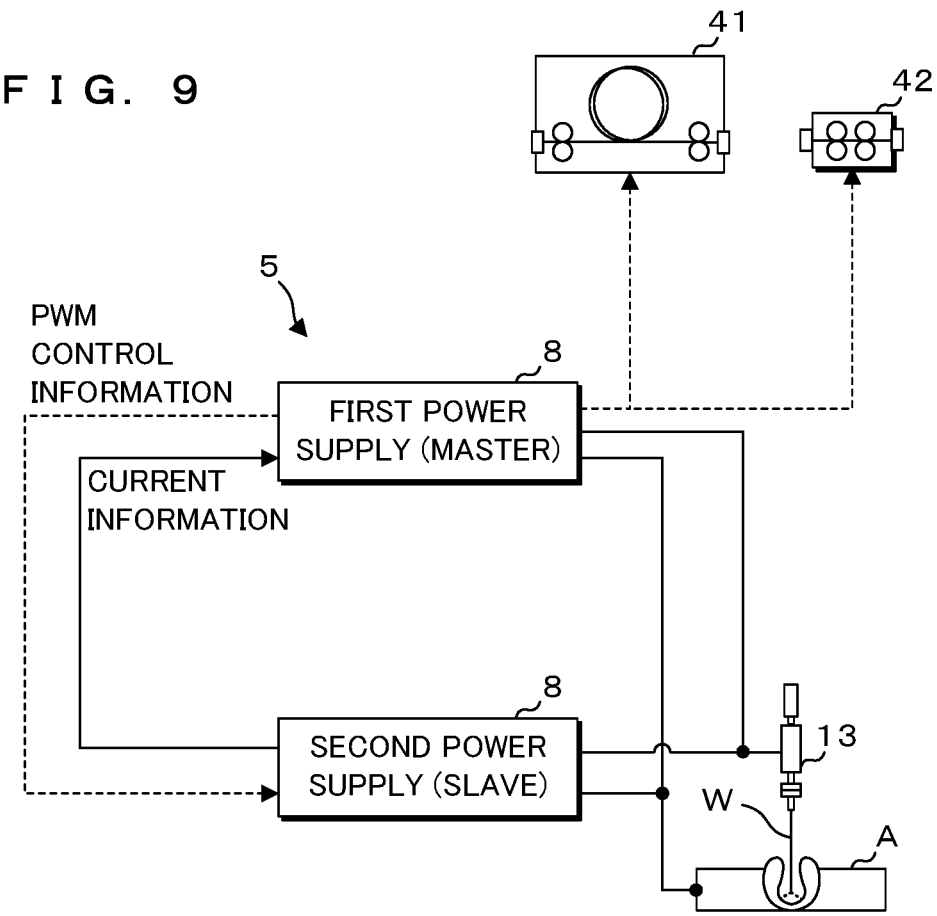
FIG. 9 is a block diagram illustrating a configuration example of a power supply device according to Embodiment 3.

FIG. 9 is a block diagram illustrating a configuration example of the power supply device 5 according to Embodiment 3. The power supply device 5 according to Embodiment 3 includes multiple power supplies 8 that are connected in parallel to a common load concerning arc welding, to feed electricity to the load. The power supplies 8 are connected with each other by a communication line. The multiple power supplies 8 are insulating switching power supplies, which perform AC/DC conversion on the alternating current into required direct current, and supply the converted direct current to the load.

One power supply 8 of the multiple power supplies 8 functions as a master power supply that controls the output of each power supply 8 by transmitting PWM control information to a different power supply 8 via a communication line. The different power supply 8 receives the PWM control information transmitted from the one power supply 8, and functions as a slave power supply that controls the output based on the received PWM control information. In the description below, the power supply 8 which functions as a master power supply is appropriately referred to as a first power supply 8, whereas the power supply 8 which functions as a slave power supply is referred to as a second power supply 8. A single second power supply 8 or multiple second power supplies 8 may be provided.

The second power supply 8 detects current output from its own device to the load, and transmits the current information indicating the detected current to the first power supply 8 via a communication line. The first power supply 8 receives the current information transmitted from the second power supply 8, and calculates the total current output from the power supply device 5 to the load by adding the current indicated by the current information and the current detected by its own device. The first power supply 8 then detects voltage to be output from its own device to the load, and calculates PWM control information for controlling the output of each power supply 8 constituting the power supply device 5 based on the voltage obtained by detection and the total current. The first power supply 8 controls the output of its own device based on the PWM control information calculated as described above, while controlling the operation of each power supply 8 by transmitting the PWM control information to the second power supply 8 as described above.

It is noted that, as will be described later, each power supply 8 may function as either one of the master power supply and the slave power supply by switching the operation mode. Moreover, the power supply 8 may function as a single independent power supply 8 by switching the operation mode.

Figure 10:
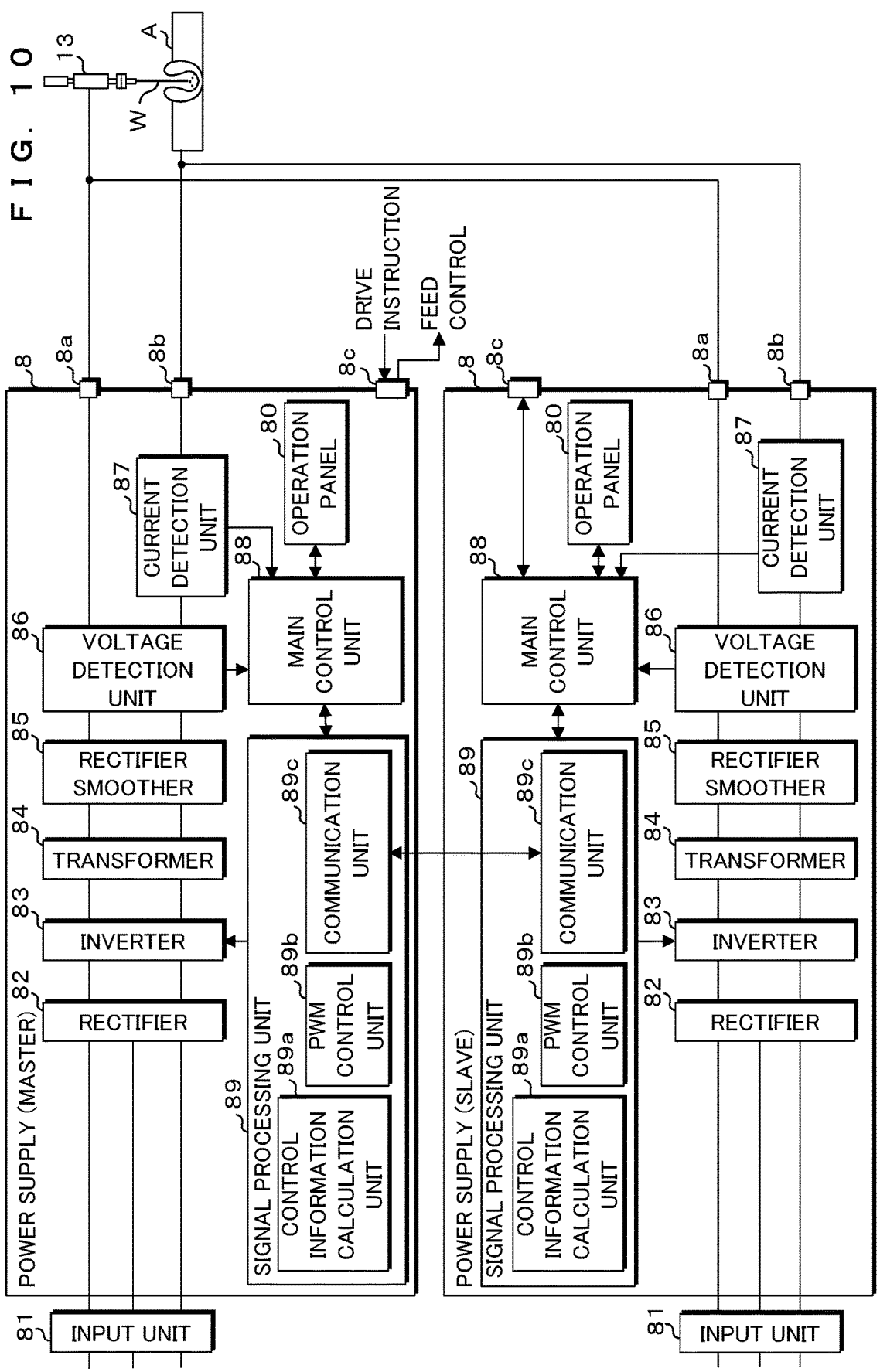
FIG. 10 is a block diagram illustrating a configuration example of a power supply.

FIG. 10 is a block diagram illustrating a configuration example of the power supplies 8. To simplify the description, it is assumed here that the power supply device 5 is constituted by two power supplies, i.e. the first power supply 8 and the second power supply 8. Each of the first power supply 8 and the second power supply 8 is a constant voltage characteristic power supply with the maximum output of 500 A, for example. The power supply device 5 may output the current of 1000 A at maximum by synchronous control of the first power supply 8 and the second power supply 8. Since the first and second power supplies 8 are configured in the same manner, the configuration of one of the power supplies 8 will mainly be described.

The power supply 8 includes an operation panel 80, an input unit 81, a rectifier 82, an inverter 83, a transformer 84, a rectifier smoother 82, a voltage detection unit 86, a current detection unit 87, a main control unit 88 and a signal processing unit 89.

The input unit 81 is an input terminal connected to a three-phase AC power supply (not illustrated), for example. The input unit 81 is connected to the rectifier 82, and the three-phase alternating current applied to the input terminal is input to the rectifier 82.

The rectifier 82 is, for example, a diode bridge circuit. The diode bridge has a circuit configuration where three sets of serial circuits constituted by two forwardly connected diodes (not illustrated) are arranged in parallel. Moreover, a smooth capacitor (not illustrated) is located at an output terminal of the diode bride circuit. The rectifier 82 full-wave rectifies the alternating current input from the three-phase AC power supply through the input unit 81, and outputs the direct current smoothed at the smooth capacitor to the inverter 83.

The inverter 83 is a circuit which converts the direct current rectified and smoothed at the rectifier 82 into high frequency alternating current and outputs the converted current to the transformer 84. The inverter 83 is, for example, a full-bridge circuit constituted by four switching elements. The full bridge circuit has a circuit configuration where two sets of legs including two serially-connected switching elements are connected in parallel. Each of the switching elements is a power device such as an insulated gate bipolar transistor (IGBT) or a metal-oxide semiconductor field effect transistor (MOSFET), for example.

The transformer 84 transforms the alternating current output from the inverter 83, and outputs the transformed alternating current to the rectifier smoother 85. The transformer 84 is provided with a primary coil and a secondary coil that are wound around cores and are magnetically coupled with each other, the primary coil being connected to the inverter 83 while the secondary coil being connected to the rectifier smoother 85.

The rectifier smoother 85 is a circuit for rectifying and smoothing the alternating current output from the transformer 84. The voltage and current of the rectified direct current are output from the positive output terminal 8a and the negative output terminal 8b to a load. The rectifier smoother 85 is constituted by, for example, a full-wave rectifying circuit using a center tap, a smoothing circuit using a reactor, and so forth.

The load is for arc welding, for example, and employs welding wire W, a base material A, an arc 7 from which shield gas is ionized, or the like. The positive output terminal 8a is electrically connected to the welding wire W via a positive side feeder and the welding torch 13, whereas the negative output terminal 8b is connected to the base material A via a negative-side feeder.

The voltage detection unit 86 is, for example, a circuit that is connected to the output side of the rectifier smoother 85, detects voltage output from its own device to the load, and outputs a voltage value signal indicating the detected voltage value to the main control unit 88.

The current detection unit 87 is, for example, a circuit that is located at the output side of the rectifier smoother 85, detects current output from its own device to the load, and outputs a current value signal indicating the detected current value to the main control unit 88. The current detection unit 87 is a hall current sensor provided with a magneto-electric transducer such as a hall element, for example.

The main control unit 88 is a processor including a central processing unit (CPU), a ROM, a RAM, an interface and the like, and controls the operation of the entire power supply 8. A control terminal 8c is connected to the interface of the main control unit 88. A control communication line of a welding machine is connected to the control terminal 8c of the power supply 8 serving as a master power supply, and a drive instruction signal output from the welding machine is input to the control terminal 8C. The main control unit 88 monitors the input state of the drive instruction signal, and outputs a drive request for operating the inverter 83 to the signal processing unit 89 in the case where the drive instruction signal is input. No drive instruction signal is input to the control terminal 8c of the power supply 8 serving as a slave power supply.

Moreover, the interface of the main control unit 88 is connected to a voltage detection unit 86 and a current detection unit 87, to which a voltage value signal and a current value signal are input. The main control unit 88 AD-converts the input voltage value signal and current value signal, and outputs voltage information and current information obtained by AD conversion to the signal processing unit 89.

Furthermore, the main control unit 88 is connected to the operation panel 80, and a signal corresponding to the operation to the operation panel 80 is input. The main control unit 88 accepts the operation to the operation panel 80 by monitoring the signal. The main control unit 88 according to the present embodiment may accept selection of the operation mode of the power supply 8 through the operation panel 80. The operation mode includes a master power mode (first control form) causing the power supply 8 to function as a master power supply, a slave power mode (second control form) causing the power supply 8 to function as a slave power supply, and a single power mode causing the power supply 8 as a single power supply. Moreover, the main control unit 88 is configured to display the operation state of its own device on the operation panel 80 by outputting a display instruction signal for displaying various operation states such as the operation mode, output voltage, output current or the like of its own device to the operation panel 80.

Furthermore, the main control unit 88 of the power supply 8 operating as a master power supply outputs a wire feeding control signal for controlling feed of the welding wire W in a welding machine from the control terminal 8c to the welding machine. It is noted that the power supply 8 operating as a slave power supply outputs no wire feeding control signal.

The signal processing unit 89 is a digital signal processor (DSP) outputting a PWM signal to a switching element constituting the inverter 83 and performing PWM control for on/off of the switching element, and includes a control information calculation unit 89a, a PWM control unit 89b and a communication unit 89c. The signal processing unit 89 is connected to the inverter 83 and the main control unit 88. Voltage information, current information, drive request and the like output from the main control unit 88 are input to the signal processing unit 89. The signal processing unit 89 stores therein the operation mode of its own device, and the details of its signal processing depends on the operation mode of the power supply 8. The details of signal processing will be described later.

The control information calculation unit 89a is a function part that calculates PWM control information for controlling the voltage or current to be output to the load by controlling the operation of the inverter 83. The PWM control information is information indicating the pulse width and pulse waveform of the PWM signal to be output to the inverter 83.

In the case where the operation mode is the single power mode, the control information calculation unit 89a calculates PWM control information for performing PWM control on the inverter 83 of its own device based on the voltage information and current information output from the main control unit 88, that is, on the voltage and current detected at its own device.

In the case where the operation mode is the master power mode, the control information calculation unit 89a calculates PWM control information for performing PWM control on the inverter 83 of the first and second power supplies 8 based on the voltage information and current information of its own device output from the main control unit 88, and on the current information concerning a different power supply 8. That is, the control information calculation unit 89a calculates PWM control information based on the voltage and current detected at its own device and the current detected at a different power supply 8 which is a slave power supply. It is noted that the current information detected at the different power supply 8 may be received by the communication unit 89*c*.

In the case where the operation mode is the slave power mode, the control information calculation unit 89*a* will not calculate PWM control information.

The PWM control unit 89*b* is a function part that generates a PWM signal having a required pulse width and pulse waveform using PWM control information and outputs the generated PWM signal to the inverter 83. The PWM control unit 89*b* outputs alternating current from the inverter 83 by alternately switching the switching element of the full bridge circuit between the on state and the off state in a crisscross manner.

In the case where the operation mode is the single power mode or master power mode, the PWM control unit 89*b* generates a PWM signal using the PWM control information calculated by the control information calculation unit 89*a* of its own device.

In the case where the operation mode is the slave power mode, the PWM control unit 89*b* generates a PWM signal using the PWM control information calculated at a different power supply 8. The PWM control information calculated at the different power supply 8 may be received by the communication unit 89*c*. In the case where its own device and the different power supply 8 have the same output capacity, the PWM signal for its own device and the PWM signal for the different power supply 8 will be approximately the same signal as a result. In the case where they have different output capacities, the PWM control unit 89*b* generates a PWM signal for which the difference in the output capacities is corrected using the PWM control information calculated at the different power supply 8. Here, the PWM signal for its own device and the PWM signal for the different power supply 8 will be different signals.

The communication unit 89*c* is a communication circuit for transmitting and receiving various information to/from the different power supply 8. The communication unit 89*c* transmits and receives information according to the host control interface (HCl) communication protocol.

In the case where the operation mode is the master power mode, the signal processing unit 89 transmits through the communication unit 89*c* the operation information indicating the operation state of the inverter 83 of its own device and the PWM control information calculated by the control information calculation unit 89*a* to the different power supply 8 operating in the slave power mode. The power supply 8 receives, by the communication unit 89*c*, the operation information and PWM control information transmitted from the power supply 8 operating in the master power mode.

In the case where the operation mode is the slave power mode, the signal processing unit 89 transmits through the communication unit 89*c* current information indicating current being output from its own device to the load, operation information indicating the operation state of the inverter 83 of its own device and abnormality information indicating the presence/absence of its own device, to the power supply 8 operating in the master power mode. The abnormality information is information indicating, for example, excess current and/or abnormal stop. The power supply 8 which is the master power supply receives, by the communication unit 89*c*, the current information, operation information and abnormality information transmitted from the power supply 8 operating in the slave power mode.

The operation panel 80 includes a current display unit and a voltage display unit indicating the current and voltage that are being output to the load.

In the case where the operation mode is the master power mode, the main control unit 88 causes the current display unit to display the value of total current obtained by adding the current being output from each power supply 8. The main control unit 88 also causes the voltage display unit to display the value of the voltage obtained by detecting it at its own device. In the case where the operation mode is the slave power mode, the main control unit 88 causes the current display unit and voltage display unit to display predetermined information indicating that its own device is being driven. The predetermined information is text information such as "being driven" or "RUN" for example, the content of information to be displayed is not particularly limited but may also include a configuration where the display pixels or segments constituting the current display unit and voltage display unit are all turned on or off. In the case where the operation mode is the single power mode, the main control unit 88 causes the current display unit and voltage display unit to display the values of current and voltage being output from its own device.

Moreover, the operation panel 80 includes an operation unit for switching the operation mode of the power supply 8 and an operation mode display unit for displaying the current operation mode of its own device. The operation unit may be, for example, a sealed tactile switch or a push button switch. When the operation unit is operated, the main control unit 88 of the power supply 8 switches the current operation mode to a different operation mode. For example, the signal processing unit 89 stores the current operation mode, and the main control unit 88 switches the operation mode of the signal processing unit 89 by outputting a mode switching instruction to the signal processing unit 89. The operation mode is switched in turns, from the single power mode, the master power mode, the slave power mode and back to the single power mode . . . , every time the operation unit is operated, for example.

The operation mode display unit has multiple light emitting elements. The light emitting elements include, for example, a light emitting element which is turned on in the master power mode and a light emitting element which is turned on in the slave power mode.

Figure 11:
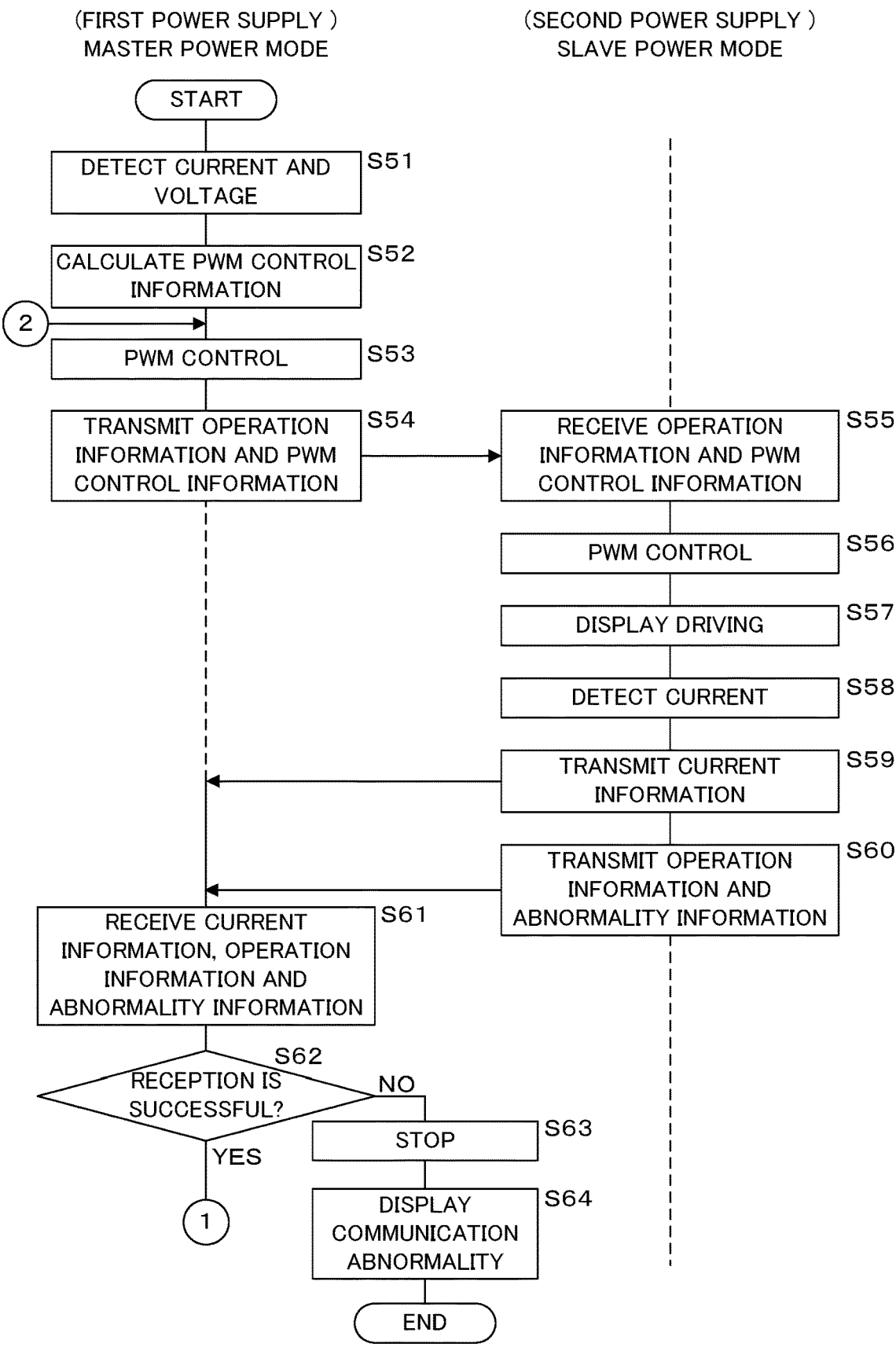
FIG. 11 is a flowchart illustrating a processing procedure for each power supply concerning power supply control.
Figure 12:
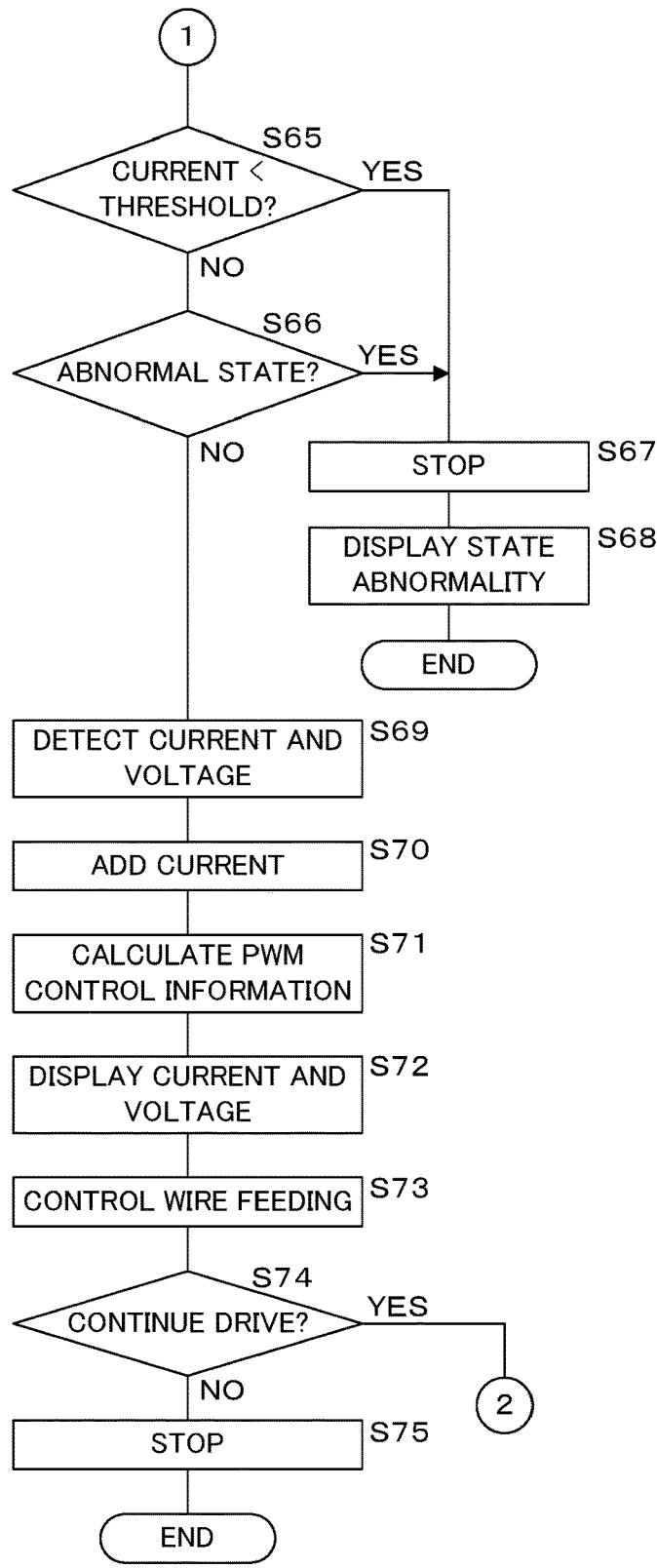
FIG. 12 is a flowchart illustrating a processing procedure for each power supply concerning power supply control.

FIGS. 11 and 12 show a flowchart illustrating a processing procedure for each power supply 8 concerning power feeding control. Here, description is made on the processing of the first power supply 8 operating in the master power mode and the second power supply 8 operating in the slave power mode.

If a drive instruction signal is input to the first power supply 8 which is the master power supply, the main control unit 88 detects the current and voltage being output from its own device to the load by the current detection unit 87 and the voltage detection unit 86 (step S51). The main control unit 88 outputs the detected and obtained current information and voltage information to the signal processing unit 89.

The signal processing unit 89 in the master power mode calculates PWM control information based on the current and voltage indicated by the current information and voltage information (step S52). Since the slave power supply 8 is not in operation yet at the time of activation, the current and voltage detected at the first power supply 8 are used to calculate PWM control information, for example.

The signal processing unit 89 then performs PWM control on the inverter 83 based on the calculated PWM control information (step S53). Subsequently, the signal processing unit 89 transmits the operation information indicating the operation state of the inverter 83 as well as the PWM control information to the second power supply 8 which is the slave power supply through the communication unit 89c (step S54). The operation information is, for example, information indicating whether or not the inverter 83 is being driven.

The signal processing unit 89 in the slave power mode receives, by the communication unit 89c, the operation information and PWM control information transmitted from the first power supply 8 (step S55). The signal processing unit 89 in the slave power mode then confirms that the master power supply is being driven based on the operation information, and performs PWM control on the inverter 83 of its own device based on the received PWM control information (step S56).

It is noted that the communication unit 89c performing transmission at step S54 corresponds to a control information transmission unit, whereas the communication unit 89c performing reception at step S55 corresponds to a control information reception unit.

Subsequently, the main control unit 88 of the second power supply 8 causes the operation panel 80 to display the fact that it is being driven if its own device is normally operating (step S57). For example, the main control unit 88 causes the current display unit and voltage display unit to display that it is being driven.

Subsequently, the main control unit 88 detects current being output from its own device to the load by the current detection unit 87 (step S58). The main control unit 88 outputs the detected and obtained current information to the signal processing unit 89.

The signal processing unit 89 in the slave power mode transmits the current information detected and obtained by its own device to the first power supply 8 which is the master power supply through the communication unit 89c (step S59). Moreover, the signal processing unit 89 transmits the operation information indicating the operation state of the inverter 83 of its own device as well as abnormality information indicating the presence/absence of abnormality to the first power supply 8 through the communication unit 89c (step S60).

The signal processing unit 89 in the master power mode that transmitted the PWM control information or the like receives the current information, operation information and abnormality information transmitted from the second power supply 8 (step S61), and determines whether or not the reception is successful (step S62).

It is noted that the communication unit 89c performing transmission at step S60 corresponds to a current information transmission unit, and also to an abnormality information transmission unit. Furthermore, the communication unit 89c performing reception at step S61 corresponds to a current information reception unit and abnormality information reception unit.

If it is determined that no response from the second power supply 8 is received for a predetermined period of time and that reception fails (step S62: NO), the signal processing unit 89 stops operation of the inverter 83 and calculation of PWM control information to stop the output to the load (step S63). When the calculation of PWM control information at the first power supply 8 is stopped, the operation of the second power supply 8 which is the slave power supply is also stopped.

Furthermore, the signal processing unit 89 notifies the main control unit 88 of a communication abnormality, and the main control unit 88 causes the operation panel 80 to display that an abnormality concerning communication is present (step S64), and terminates the processing.

In addition to the case where a communication line is cut and where the connection of a connector fails, a communication abnormality also occurs in the case where the power supply 8 to be operated as the slave power supply is erroneously operated in the master power mode.

If it is determined that a response from the second power supply 8 is received and that the reception of the current information, operation information and abnormality information is successful (step S62: YES), the signal processing unit 89 determines whether or not the current indicated by the received current information is less than a predetermined threshold (step S65). The signal processing unit 89 making the determination at step S65 corresponds to a determination unit.

If it is determined that the current is equal to or larger than a threshold value (step S65: NO), the signal processing unit 89 determines whether or not the state of the second power supply 8 is abnormal based on the received abnormality information (step S66). For example, in case where the abnormality information indicates that the inverter 83 of the second power supply 8 is in a stopped state, or where the abnormality information indicates an abnormality such as excess current, the signal processing unit 89 determines that an abnormality is present.

If it is determined that the current is less than a threshold (step S65: YES), or that an abnormality is present in the second power supply 8 (step S66: YES), the signal processing unit 89 stops operation of the inverter 83 and calculation of PWM control information to stop the output to the load (step S67). Furthermore, the signal processing unit 89 notifies the main control unit 88 of a state abnormality, and the main control unit 88 causes the operation panel 80 to display that an abnormality is present in the slave power supply (step S68) and terminates the processing.

If it is determined that the second power supply 8 is normally operating (step S66: NO), the main control unit 88 detects the current and voltage being output from its own device to the load by the current detection unit 87 and the voltage detection unit 86 (step S69). The main control unit 88 then adds the current obtained by detection at its own device to the current indicated by the current information received from the second power supply 8 (step S70). The signal processing unit 89 then calculates PWM control information based on the current obtained by adding at step S70 and the voltage detected at its own device (step S71). The PWM control information calculated here is information based on the current and voltage to be output from the entire power supply device 5 to the load, and is capable of controlling the output of the entire power supply device 5.

Subsequently, the main control unit 88 causes the current display unit to display the value of current calculated at step S70, and causes the voltage display unit to display the value of voltage detected at step S69 (step S72).

Meanwhile, the main control unit 88 transmits information for controlling the welding machine, e.g., a wire feed control signal for controlling feeding of the welding wire W, from the control terminal 8c to the welding machine (step S73). The wire feed control signal is, for example, a signal for controlling the feeding speed of the welding wire W, and the start and stop of feeding.

Subsequently, the main control unit 88 determines whether or not a drive instruction signal continues being input (step S74). If it is determined that no drive instruction signal is being input (step S74: NO), the signal processing unit 89 stops control of the inverter 83 by the signal processing unit 89 to stop the output to the load (step S75), and terminates the processing. If it is determined that the drive instruction signal is being input (step S74: YES), the main control unit 88 returns the processing to step S53 and continues the control of feeding to the load.

Thus, in the power supply device 5 configured as described above, the first power supply 8 which is the master power supply acquires current information from the second power supply 8 which is the slave power supply, and calculates PWM control information for controlling the output of each power supply 8. The first power supply 8 then transmits the calculated PWM control information to the second power supply 8, and the second power supply 8 which is the slave power supply controls the output based on the PWM control information calculated on the master power supply side. Accordingly, in the power supply device 5 according to the present embodiment, current to be output from each power supply 8 to the load may stably be controlled.

Moreover, the user is able to confirm the information of current and voltage being output from the power supply device 5 to the load, using the current display unit and voltage display unit of the first power supply 8 operating as the master power supply.

Furthermore, predetermined information may be displayed on the current display unit and voltage display unit of the second power supply 8 operating as the slave power supply, so as to prevent the user from unnecessary confusion.

Furthermore, if current information that is supposed to be transmitted from the slave power supply cannot be received, the first power supply 8 which is the master power supply may assume that an abnormality is present in the communication between the first power supply 8 and the second power supply 8 which is the slave power supply, and stop the entire power supply device 5 to secure its safety.

In addition, if the current output from the second power supply 8 which is the slave power supply is less than a threshold even though the current is being output by its own device, the first power supply 8 which is the master power supply assumes that an abnormality is present in the second power supply 8 and may stop the entire power supply device 5 so as to secure its safety.

Furthermore, if an abnormality is present in the operation state of the second power supply 8 which is the slave power supply, the first power supply 8 which is the master power supply may stop the entire power supply device 5 to secure its safety.

Furthermore, the power supply device 5 may be maintained in its integrity by stopping the power supply device 5 at the time of such abnormalities.

In addition, the power supply 8 according to the present embodiment may function as either one of the master power supply and the slave power supply by operating the operation unit. Accordingly, even if the master power supply constituting the power supply device 5 fails, the power supply device 5 may easily be reconstructed by switching the operation mode of the power supply 8 functioning as the slave power supply to the master power mode.

Moreover, the power supply 8 according to the present embodiment may also function as an independent power supply by operating the operation unit.

While the present embodiment described an example where mainly two power supplies 8 are connected in parallel with a common load, the power supply device 5 may also be configured using three or more power supplies 8.

While the load concerning arc welding was described as a load, the power supply device 5 that feeds to a load requiring large current such as that concerning arc cutting may also be employed.

Furthermore, the power supply device 5 according to the present embodiment may output large current to the arc welding machine.

While the present embodiment described the example where PWM control is performed on the switching power supply of the insulating transformer type, the configuration and control method of the power supply 8 are not particularly limited but may also employ a known configuration and control method.

In addition, while the present embodiment described the example where the entire power supply device 5 is stopped when an abnormality is present in the power supply 8 operating as the slave power supply, another configuration may also be possible where power feeding to the load continues if the power supply device 5 has no problem as a whole. For example, in the case where multiple slave power supplies are connected in parallel, a cutoff relay or the like is provided that cuts off the power supply 8 with an abnormality from the power supply device 5 and the remaining power supplies 8 are able to supply required power, normally operating power supplies 8 may continue operating.

It is to be noted that, as used herein and in the appended claims, the singular forms "a", "an", and "the" include plural referents unless the context clearly dictates otherwise.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

The invention claimed is:

1. An arc welding system of a consumable electrode type, comprising:
    a wire feeding device that feeds welding wire from a wire feeding source to a welding torch; and
    a power supply device that supplies electric power between a base material and the welding wire fed to the welding torch by the wire feeding device,
    the system being configured to weld the base material by arc generated between the welding wire and the base material by the electric power that is supplied, wherein
    the wire feeding device includes
    an intermediate wire feeding source that is disposed between the wire feeding source and the welding torch and is configured to temporarily accommodate the welding wire fed from the wire feeding source and to feed the welding wire being accommodated to the welding torch;
    a first feeder that feeds the welding wire of the wire feeding source to the intermediate wire feeding source; and
    a second feeder that feeds the welding wire accommodated in the intermediate wire feeding source to the welding torch;
    wherein the intermediate wire feeding source includes
    a detector that detects an accommodated amount of the welding wire;
    a housing having a placement surface for placing the intermediate wire feeding source, a side face and an upper face, including the first feeder inside and accommodating the welding wire;

an inlet provided in the side face through which the welding wire fed from the wire feeding source is introduced via a first conduit cable, the first conduit cable connecting the housing and the wire feeding source; and an outlet provided in the upper face through which the welding wire accommodated inside the housing is sent out to the second feeder via a second conduit cable, the second conduit cable connecting the housing and the second feeder, wherein the wire feeding device further includes a feed controller that controls feeding of the first feeder so as to accommodate a predetermined amount of welding wire based on a detection result obtained by the detector, and wherein the welding wire is guided by the first conduit cable as well as the second conduit cable, and is fed to the welding torch via the intermediate wire feeding source, the power supply device includes a first power supply and a second power supply that are connected in parallel and that supply electric power between the welding wire and the base material, the first power supply controls power feeding by the first power supply and the second power supply and feeding of welding wire by the wire feeding device, the wire feeding device feeds the welding wire at a speed equal to or higher than 5 meters per minute at which a tip end of the welding wire enters a concave melted portion formed in the base material by the arc generated between the welding wire and the base material, the tip end of the welding wire is surrounded by the concaved melted portion, and the arc is generated between the tip end and a bottom part as well as a side part of the concaved melted portion, and the power supply device changes a welding current flowing between the welding wire and the base material such that a frequency of the welding current is in a range from 10 Hz to 1000 Hz, an average current is 300 A or larger and a current amplitude is 50 A or higher.

2. The arc welding system according to claim 1, wherein a load concerning feed of welding wire passing through the first conduit cable is larger than a load concerning feed of welding wire passing through the second conduit cable.

3. The arc welding system according to claim 1, comprising a welding robot having an arm holding the welding torch, wherein the second feeder is located at the arm of the welding robot, and the intermediate wire feeding source is arranged side by side with the welding robot.

* * * * *